(12) United States Patent
Kleinhoff et al.

(10) Patent No.: US 6,564,840 B2
(45) Date of Patent: *May 20, 2003

(54) LAMELLA OF HIGH STABILITY FOR A VULCANIZATION MOLD, VULCANIZATION MOLD WITH SUCH LAMELLAS, VEHICLE TIRE WITH TIRE TREAD IN WHICH SIPES ARE PRODUCED BY SUCH LAMELLAS

(75) Inventors: Klaus Kleinhoff, Rodenberg (DE); Otto Beckmann, Hannover (DE)

(73) Assignee: Continental Aktiengesellschaft (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/324,584

(22) Filed: Mar. 24, 1999

(65) Prior Publication Data

US 2002/0053383 A1 May 9, 2002

(30) Foreign Application Priority Data

Mar. 24, 1998 (DE) .......................... 198 12 778

(51) Int. Cl.⁷ .......................... B29C 33/42; B60C 11/12
(52) U.S. Cl. .......................... 152/209.18; 152/209.23; 152/DIG. 3; 425/28.1; 425/35; 425/46
(58) Field of Search ................ 152/209.18, 209.21, 152/209.23, DIG. 3; 425/28.1, 35, 46

(56) References Cited

U.S. PATENT DOCUMENTS

| | | | | |
|---|---|---|---|---|
| 3,199,567 A | * | 8/1965 | Kunz et al. | |
| 3,511,290 A | * | 5/1970 | Kutsmichel | 152/209.21 |
| 3,608,602 A | * | 9/1971 | Youngblood | 152/212 |
| 4,566,514 A | * | 1/1986 | Mauk et al. | 152/DIG. 3 |
| 5,350,001 A | * | 9/1994 | Beckmann et al. | 152/DIG. 3 |
| 5,783,002 A | * | 7/1998 | Lagnier | 152/DIG. 3 |
| 6,026,875 A | * | 2/2000 | Diensthuber et al. | 425/28.1 |
| 6,116,310 A | * | 9/2000 | Shinohara | 152/209.21 |

FOREIGN PATENT DOCUMENTS

| | | | | |
|---|---|---|---|---|
| AT | 401 160 B | | 11/1995 | |
| DE | 4107547 | * | 9/1991 | 152/DIG. 3 |
| DE | 44 27 895 A1 | | 2/1996 | |
| DE | 196 50 702 A1 | | 6/1998 | |
| DE | 197 10 400 A1 | | 9/1998 | |
| EP | 0 564 435 A1 | | 10/1993 | |

(List continued on next page.)

OTHER PUBLICATIONS

Translation for Japan 5–58118.*

*Primary Examiner*—Steven D. Maki
(74) *Attorney, Agent, or Firm*—R W Becker & Associates; R W Becker

(57) ABSTRACT

A lamella for use in a vehicle tire vulcanization mold has projections and depression, wherein the height of the projections and the depth of the depressions extend substantially parallel to a peripheral surface of the tire tread of the vehicle tire to be molded in the vulcanization mold. Each one of the projections has a highest point-shaped location or top. Each one of the depressions has a lowest point-shaped location or crater. The projections and depressions are distributed according to a substantially uniform areal division. The areal division is defined by dividing lines extending in a dividing plane preferably centrally positioned between a first plane defined by the tops and a second plane defined by the craters. The dividing lines are comprised of three sets wherein the dividing lines within each one of the sets extend parallel to one another and wherein the dividing lines of different ones of the sets intercept one another at an angle of substantially 60° so that a grid of triangles is formed. Instead of point-shaped highest or lowest locations, line-shaped highest and lowest locations can be provided.

42 Claims, 34 Drawing Sheets

FOREIGN PATENT DOCUMENTS

| | | | | |
|---|---|---|---|---|
| EP | 810104 | * 12/1997 | ............ | 152/DIG. 3 |
| FR | 791.250 | 12/1935 | | |
| GB | 1150295 | 4/1969 | | |
| JP | 5-58118 | * 3/1993 | ............ | 152/DIG. 3 |
| JP | 6-143941 | * 5/1994 | ............ | 152/DIG. 3 |
| JP | 10-52824 | * 2/1998 | | |
| WO | 96 01189 | 1/1996 | | |
| WO | WO 99/48707 | * 9/1999 | ............ | 152/DIG. 3 |

\* cited by examiner

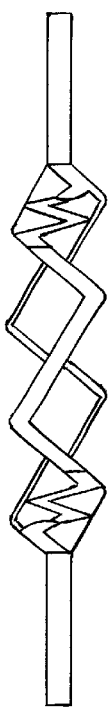
FIG.26a
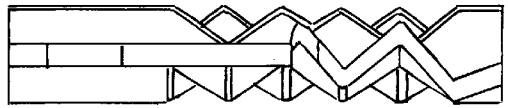
FIG.26b
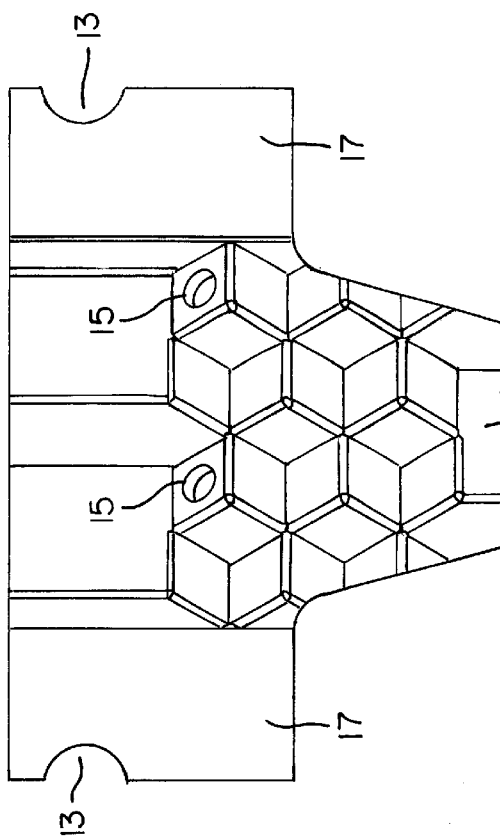
FIG.26c
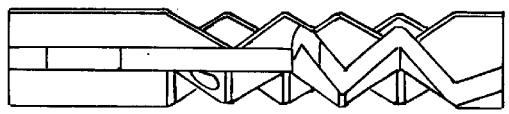
FIG.26.d
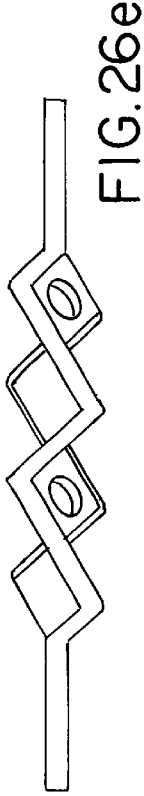
FIG.26e

LAMELLA OF HIGH STABILITY FOR A VULCANIZATION MOLD, VULCANIZATION MOLD WITH SUCH LAMELLAS, VEHICLE TIRE WITH TIRE TREAD IN WHICH SIPES ARE PRODUCED BY SUCH LAMELLAS

BACKGROUND OF THE INVENTION

The present invention relates to a lamella for use in vulcanization molds for producing a vehicle tire. The lamella has projections and depressions extending substantially parallel to the peripheral surface of the tire tread of the vehicle tire to be produced. Each projection has a highest point-shaped location and each depression has a lowest point-shaped location whereby the projections and the depressions are substantially arranged in a uniform area division. The areal division is defined by linear (line-shaped) dividing lines positioned preferably centrally between the highest point-shaped locations and the lowest point-shaped locations. The dividing lines are comprised of sets whereby the dividing lines within each set extend parallel to one another and the dividing lines of different sets intercept one another. The projections may also have a line-shaped (linear) highest location while the depressions still have a lowest point-shaped location or, in the alternative, each projection may have a highest point-shaped location while the depression has a line-shaped (linear) lowest location. In this case, the dividing lines are either positioned at the highest line-shaped location or the lowest line-shaped location.

The present invention also relates to a vulcanization mold having lamellas as disclosed above.

Also, the invention relates to a vehicle tire having a tire tread with sipes that are produced by lamellas embodied as disclosed above.

The inventive lamella is to be used in vulcanization molds (2) whereby such vulcanization molds (2) are used for producing vehicle tires (3). The inventive lamellas are arranged in the area of the tire tread to be molded in order to produce in the tire tread sipes having a design that matches, with the exception of minimal uniform shrinkage, the negative pattern of the lamella design.

Even though the greatest economic value of the invention lies within the inventive vehicle tire with the novel sipes, in the present application the inventive lamella will be disclosed first because with it the complicated special shape of the lamella of the present invention can be more easily shown than the sipes of a tire tread.

Even though the rubber mixture of the tire tread during molding of the sipes by lamellas is still plastic and shrinkage of the rubber during cooling from the vulcanization temperature to the tire operating temperature is minimal and is substantially uniform in all three special directions, the design of the sipe matches substantially exactly the shape of the lamella that has produced this sipe. The sipe and the lamella producing this sipe behave, with the exception of minimal shrinkage, as a positive and a negative pattern so that their edges are substantially inverse congruent, i.e., each body edge of the lamella projecting counter to a direction of viewing has a negative edge extending in the same direction which is a avoid area edge within the same projection counter to that same direction of viewing and each body edge of the lamella with a projection in the direction of viewing has a negative edge extending in the same direction within the same projection. This means that by disclosing the shape of the lamella the shape of the sipes in the tire is also disclosed.

It is known that such sipes in tire treads serve to soften the tire tread and also provide edge formation in order to thus increase grip on slippery surfaces. Such sipes are especially used in large numbers for snow tires.

It is also known that the degree of softening depends approximately with the third power from the depth of the sipe. This results in the problem for smooth sipes that the cut tread surface when the tire is new, especially when a sipe depth is identical to the depth of the tread grooves, the tread surface is unnecessarily soft and has an unnecessary degree of edge formation with disadvantages during dry handling, respectively, with respect to wear.

Even though a reduced depth of the sipes eliminates such disadvantages, another disadvantage is produced, i.e., after wear of a tread depth corresponding to the reduced sipe depth, sipes are no longer present. Accordingly, the tire will loose its grip on slippery surfaces.

An improved solution is known according to which for a full sipe depth the effectiveness of the areas located deep within the sipe is greatly limited in that the sipes are wave-shaped or curved so that positive-locking engagement between the closely positioned walls of the same sipe will result. According, only small radially outer areas of the sipes are effective whereby these effective areas with increased wear will move radially inwardly so that the softening effect, by propagation of the effective deformation base to the actual sipe base, will fluctuate less.

Conventionally sipe widths in car tires are between 0.4 to 1.0 mm, whereby especially the width of approximately 0.6 mm is used for car tires. Car tires are the preferred application of the invention. Inasmuch as such sipes are used for truck tires, commercial truck tires or even heavy truck tires, the required width increases approximately with the root of the suggested tire pressure and linear with the depth of the tire tread. For heavy truck tires with approximately four times the tire pressure and twice the tread depth, suitable sipe widths are between 1.6 and 4.0 mm, preferably 2.4 mm.

The known suggestions, to provide after a limited deformation travel positive-locking engagement as a function of the width of the sipe, can be divided into three groups.

A first group comprises the suggestions of wave-shaped sipes. In contrast to the aforementioned depressions and projections of the prior art, upon which the inventive design is based, all projections have a line-shaped (linear) highest location, usually referred to as a peak, even more precisely referred to as a crest (BK), and all depressions have a line-shaped (linear) lowest location, usually referred to as a valley, even more precisely referred to as a valley bottom (TS). Such suggestions can be taken from FIG. 2 of French Patent 791 250, European Patent application 0 564 4 35, German Patent application 44 27 895, Austrian Patent 401 160 and still unpublished German Patent applications 196 50 702.2 and 197 10 400.2 whereby the latter shows crests and valleys that are curvilinear while the others show straight lines or angled lines.

A second group includes suggestions having curved sipes wherein all projections have a line-shaped (linear) highest location and all depressions have a point-shaped lowest location or visa versa. Such a suggestion is disclosed in Great Britain patent 1,150, 295.

A third group includes suggestions having sipes that are curved such that all projections have a point-shaped highest location, referred to as a top (G), and all depressions (5) have a point-shaped lowest location, referred to as a crater (K). This is disclosed in published PCT document WO 96/01189. Based on the conventional mounting of the lamellas in the vulcanization mold, such that the produced sipes in the tire tread extend substantially axially and radially, the measuring direction for the height of the projections and the depth of the depressions extends thus substantially parallel to the peripheral surface of the tire tread of the produced vehicle tire. The depth of the depression is to be understood as a negative height. Accordingly, for the deformation height and deformation depth (more precisely the dimple depth) the same reference numeral can be used: Z.

In all suggestions of the prior art the crests or peaks of a sipe, respectively, of a lamella are positioned in a common plane and at the same time all valleys or craters of the same sipe, respectively, of the same lamella are positioned in another common plane whereby both planes extend parallel to one another. At least for the suggestions of the first and third group, it appears to be expedient to define a reference plane between these two planes. The reference plane is used to measure the deformation heights and depths, and it is referred to in the following as the Z=0 plane.

In the two following paragraphs the image is discussed which results when a lamella is cut along this reference plane (Z=0 plane). The resulting section lines are such that their height/depth (Z) extends centrally between the height of the highest location of the projections and the depth of the lowest location of the depressions. It appears to be expedient to define this height/depth Z as 0.

In the known suggestions of the first group, the produced section lines are straight or curved (DE 197 10 400). They all look alike and extend to one another so as to be staggered in parallel so that they do not intercept one another. The spacing between these lines corresponds to half the period length (repeating unit length).

It is thus expedient to define the thus generated lines as dividing lines (T). The division according to these suggestions is thus only one dimensional, i.e., perpendicular to the dividing lines.

In the known suggestions of the second group for section lines selected as above disclosed, isolated, aligned diamonds result i.e., quadrangles having identical sides. The aligned sides of these diamonds describe exactly two sets of parallel extending, straight, uninterrupted lines. Within each set of such lines, the lines extend parallel to one another. The lines of different sets intercept one another.

The periodicity (repetition pattern) of this suggestion can be illustrated in an even more simple manner when as a reference plane the plane is selected within which the line-shaped (linear) extremes are positioned, whereby it does not matter whether this extreme is the crest or the valley bottom. This results in linearly contacting, aligned diamonds, i.e., quadrangles having identical sides. The aligned sides of these diamonds are defined by two sets of parallel extending straight, uninterrupted, i.e., continuous, lines. Within each set of such lines, the continuous lines extend parallel to one another. The lines of different sets intercept one another. It appears to be expedient to define the thus generated lines in the following as dividing lines (T). The division in this suggestion is thus two-dimensional, i.e., areal. The spacing between neighboring parallel dividing lines corresponds to the period length.

For a discussion of the known suggestion of the third group the section plane is expediently positioned between the plane containing the tops and the plane containing the craters. The section then shows contacting and aligned rectangles or squares. The aligned sides of these quadrangles are comprised of two sets of parallel-extending, straight, uninterrupted, continuous lines, which are defined in the following as dividing lines. Within each set of lines, the continuous dividing lines extend parallel to one another. The lines of different sets cross (intercept) one another. This periodic division is also two-dimensional, i.e., areal. The spacing between neighboring parallel dividing lines corresponds to half the period length.

It is desired that for the inventive lamella design the sequence of depressions and projections is to be provided within a substantially uniform areal division, whereby the aforementioned areal division is to be defined by substantially straight dividing lines (T) having a height/depth ($Z_t$; whereby expediently $Z_t=0$) that is preferably centrally arranged between the height ($Z_g$) of the top (G) and the depth ($Z_k$) of the crater (K) or is positioned at the height ($Z_{bk}$ or $Z_{ts}$) of the line-shaped extremes, i.e., the crests (BK) or the valley bottom (TS).

The dividing lines (T) are to be arranged in at least two sets whereby the dividing lines (T) within each set extend parallel to one another and the dividing lines (T) of different sets intercept (cross) one another.

It is known that with respect to the tire properties the sipes are to be as thin as possible.

The inventors have realized that the optimal lamella shape not only must take into consideration the tire properties to be effected directly, but also the load on the lamellas itself. The lamellas must be so thick that their buckling and bending can be avoided reliably. While the most favorable thickness of the lamellas has in the past been determined by trial and error, the invention is based on the following analysis.

The lamellas are loaded by radial pressure and thus with regard to buckling during the profile-generating final lift of the green tire after closing of the mold and before begin of the vulcanization. When producing tires having a final lift that is smaller than the sipe depth, the lamellas upon contacting the green tire periphery with the edges forming the base of the sipe are also loaded with radial and circumferentially acting pressure and thus with respect to buckling and bending within the segment border areas.

It is therefore an object of the present invention to provide the shape of a lamella which provides in addition to excellent positive-locking engagement of the thus produced positive surfaces limiting the sipe a greater bending stiffness and thus an especially increased buckling stability relative to the lamella thickness.

SUMMARY OF THE INVENTION

Based on the aforementioned features of the prior art, this object is solved by providing dividing lines (T) in three sets whereby the dividing lines (T) of different sets intercept one another at an angle of approximately 60° so that a grid is defined that is comprised of substantially equilateral triangles. The invention is based on the recognition that triangles, especially equilateral triangles, will result in much greater stability in comparison to quadrangles when used as the basic shape of a frame work or truss structure.

When considering the points of interception between the "rigid" stays or rods of a planar frame work as joints with a pivot axis perpendicular to the plane of the frame work, it is shown that such rod triangles are stable while quadrangles are not. Quadrangles are in principle compressible and expandible along their diagonals. Accordingly, the deformed and thus bending-soft walls of the lamellas of the prior art suggestions of the second and third group are loaded even for the smallest load in the radial direction of the tire to be produced by bending forces. Even the points of interception themselves, contrary to the aforementioned hypothesis of pivot ability, are loaded by bending forces. Accordingly, such lamellas will buckle even for relatively small radial loads relative to the thickness of its wall.

In the inventive design on the other hand the sheet metal areas in the vicinity of the three sets of straight dividing lines act as a stable planar framework within the Z=0 reference plane. A degree of freedom with regard to buckling thus is present only in a direction perpendicular to the Z=0 reference plane, i.e., substantially in the peripheral direction of the tire to be produced when based on the conventional, substantially axial alignment of the sipes in plan view onto the tire tread. There is no degree of freedom with regard to buckling within the Z=0 reference plane.

Accordingly, the inventive lamellas are buckling-stable up to higher radial forces relative to the wall thickness of the lamella. This allows reduced wall thickness of the lamella having the effect on the tire properties that, even for a minimal tread block deformation, the walls, that delimit a sipe and are very close to one another, will contact one another and thus produce the desired positive-locking engagement. This provides the inventive tire with a dry handling that is close to that of excellent summer tires. Furthermore, slight advantages with respect to wear can be observed without negatively affecting handling on mud or slippery surfaces.

The prior art embodiment according to which all crests or tops of the sipes, respectively, of a lamella are positioned in one plane and all valleys or craters of the same sipe, respectively, the same lamella are positioned in another common plane, parallel to the first mentioned plane, can also be used in connection with the present invention and is disclosed in with respect to multiple embodiments.

However, an even more refined dimensioning of the lamella wall thickness is possible synergistically with the embodiment of a stable framework in the Z=0 reference plane when the reference plane Z=0 is not exactly planar but, in a plan view onto the tire tread to be manufactured, corresponding to a plan view onto the end face of the lamella to be connected to the vulcanization mold, is embodied as a cylinder mantle portion or, more preferred, in an angled embodiment as a prism mantle portion. With respect to the preferred curvature or angled embodiment, the invention does not refer to the Z=0 reference plane, but in a more general term of the Z=0 reference surface.

Since the grid stays between the points of interception of the framework are to be as buckling-resistant as possible with respect to their width and thickness, they are preferably not curved but straight. It is also preferred to concentrate the curvature onto the points of interception of the framework. This results in a design according to which the bending lines of the Z=0 reference surface coincide with at least some, more preferred all, dividing lines (T) of one of the three sets of dividing lines whereby these bending lines, in a more preferred embodiment, extend substantially radially relative to the finished tire. A bending angle of 3° between bent portions already results in a considerable stabilization. Bending angles greater than 30° appear to be unnecessary.

The angled embodiment of the Z=0 reference surface can also be zigzag-shaped, i.e., not monotonous but changing in its orientation, for example, alternating. This allows for employment of large bending angles.

Due to the high stability of the inventive triangular structure of the non-deformed or substantially non-deformed lamella areas the lamella wall thickness for car tires can be below 0.4 mm, whereby for an angled extension of the Z=0 reference surface, when viewed in a plan view, it can be taken to below 0.3 mm, and for an even more angled extension, meaning bending angles greater than 7°, even thinner.

The mentioned thickness of the sheet metal refers to the used blank of sheet metal. The finish-stamped lamella sheet metal pieces have this wall thickness only in the area of the Z=0 reference surface. The deformed portions have, due to drawing effects upon stamping, correspondingly reduced wall thickness.

For an angled extension of the Z=0 reference surface all of the crests or tops of a sipe, respectively, a lamella are positioned in a curved or angled or wave-shaped or zigzag-shaped first surface. Preferably, all valleys or craters of the same sipe or the same lamella should be positioned in a curved or angled or wave-shaped or zigzag-shaped second surface whereby preferably these first and surfaces are to be parallel to one another.

The inventive measure of angling the reference surface transforms the areally stable framework portions to a three dimensionally stable framework so that the remaining bending ability that is still possible for a planar reference surface, i.e., bending perpendicular to the Z=0 reference surface, is lowered.

The design and the advantages of the triangular framework of the inventive lamellas are especially prominent when the dividing lines are positioned within narrow areas, which may be referred to as stays or rods, which are not deformed during the stamping process. The parallel base lines (B) of adjacent (neighboring) pyramid-shaped projections or depressions have a spacing of greater than 0 so that they appear as optionally rounded or angled body edges. The width (b) of the stay surfaces (S) between parallel base lines of neighboring pyramids should be smaller than 40% of the edge length (base line) of the pyramid base surface, preferably approximately 20%.

The width (b) of the aforementioned stay surfaces (S) should be at most twice the thickness of the stay, whereby the stay thickness in the simplest manufacturing process, stamping, is substantially identical to the thickness (wall thickness) of the sheet metal blank from which the lamella is produced.

In the following the design of the inventive lamellas and sipes will be disclosed in more detail.

For variants of the invention having depressions and projections with a point-shaped highest or lowest location, it is expedient to define a reference surface substantially centrally (for non-parallel arrangements: along the bisecting line) between the two surfaces in which the extremes (tops/craters) are positioned, preferably at a location where uninterrupted, continuous lines are formed, that is the dividing lines. This reference surface is used to define all of the height and depth values of the tops and the craters. This surface in this context is referred to as the Z=0 reference surface. Inasmuch as the surfaces containing the extremes (tops and craters) are parallel to one another, the Z=0 reference surface is also parallel to these two surfaces.

For variants of the invention wherein the projections have a highest line-shaped location or the depressions have a lowest line-shaped location, the reference surface is to be defined within the plane in which all of the line-shaped highest locations or line-shaped lowest locations of the projections or depressions are positioned. This surface is referred to in the context of this invention as the Z=0 reference surface.

In addition to the variants discussed above, i.e., having all deformations projecting with their tips in one orientation (schematically represented by ++++++++) or alternating in the two possible orientations relative to the Z=0 reference surface (schematically represented as +−+−+−+−), it is possible to also have combinations of such arrangements, for example, represented schematically by +−−−+−−−.

The latter embodiment of the invention is a combination of a) projections and depressions with point-shaped highest and lowest locations and having a triangular pyramid shape and b) projections and depressions having line-shaped highest or lowest locations either at the depression or the projection in combination with point-shaped highest or lowest location at the projection of depression, respectively. This inventive combination has a Z=0 reference surface containing the three sets of uniformly intercepting sets of substantially straight dividing lines (T) forming a grid of equilateral triangles, whereby in the direction of at least one bisecting line of the triangles differently oriented deformations are positioned having an orientation sequence which differs from that of +−+−+−+− and is instead preferably represented by +−−−+−−− whereby the positive deformations are projections and the negative deformations are depressions or vice versa.

Such long repeating patterns (periodicity), in the last mentioned embodiment four dividing lengths, are to be recommended only for very small dividing lengths in comparison to the sipe depth. At least two such repeating lengths should fit into the sipe depth.

The axis of the repeating pattern to be selected as desired should be the bisecting line of the triangular base surface.

In a preferred embodiment, each one of the projections (4) of the inventive lamella (1) should be embodied as a pyramid projecting from a base surface that is an equilateral triangle and may have rounded edges or sharp edges. Each one of the depressions (5) of the inventive lamella (1) should be embodied as an inverse pyramid having a base surface that corresponds approximately to an equilateral triangle whereby the pyramid may have rounded or sharp edges.

When the height of such a pyramid is identical to the square root of ⅙ (approximately 0.4082) times the base line length (edge length) and when the base lines of neighboring deformations coincide, i.e., have the spacing 0, and when the orientation (projection or depression) of the deformations along the bisecting line of the base surfaces alternates, then this results in cubes positioned alternatingly onto their tips, i.e., an alternating sequence of cube inner surfaces and cube outer surfaces. Expediently, however, with respect to a sufficiently easy removability of the tire from the vulcanization mold, the pyramid height is selected to be smaller, preferably to approximately 30% of the base line length (edge length).

The section line between a lateral surface of such a pyramid and the base surface of such a pyramid within the exactly planar or curved or angled Z=0 reference surface is called base line (B).

The sipes produced with lamellas according to the first embodiment, respond in the same manner to acceleration and deceleration forces, i.e., they are not unidirectional, when all three base lines (B) of all pyramids are positioned centrally between the height (Zg) of the top (G) and the depth of the (Zk) of the crater (K).

In contrast to all known prior art suggestions, it is also possible to position the Z=0 reference surface outside of the center plane/surface between the plane containing all tops and the plane containing all craters. This results in that the magnitude of the depth of the crater is smaller than the magnitude of the height of the top or vice versa. This results in a unidirectional behavior of the sipes in the tread surface. The embodiments in which the Z=0 reference surface coincides with one of the surfaces containing the extremes (tops or crests or craters or valleys) exhibit also a unidirectional behavior for the same reasons.

Such unidirectional behavior can be employed especially for rear wheel driven vehicles where the wheels at the rear axle are to be provided with excellent grip in the forward direction and wherein the wheels at the front axle should be embodied substantially so as to have good braking behavior. Expediently, such a unidirectional design of the sipes is combined with a known unidirectional design of the other elements of the tread of the tire, for example, with an arrow-shaped arrangement of transverse grooves.

The especially important repeating unit (period length) in the schematic representation +−+−+−+− has the advantage that a unidirectional embodiment is avoided for shortest possible repeating units (period lengths), i.e., two dividing lengths. This means, on the other hand, that the dividing length can be selected to be relatively large, for car tires preferably approximately 3 mm. Dividing lengths that are too small will result in supporting surfaces that are too small and thus provide less stiffening. The lamellas of such alternating repeating units are characterized in that at each one of the three base lines (B) a triangular pyramid-shaped projection (4) has positioned adjacent thereto a triangular pyramid-shaped depression (5) with a respective base line (B) and that at each one of the three base lines (B) of a triangular pyramid-shaped depression (5) a triangular-shaped projection (4) is positioned with its respective base line (B).

The lamellas with non-alternating repeating units, represented schematically by ++++++, have a Z=0 reference surface with unchanged dividing lines positioned within the plane that contains the line-shaped highest or lowest location because the dividing lines themselves will become the line-shape extremes.

The inventive lamellas are designed to be mounted in the inner mold chamber of a vehicle tire vulcanization mold at the surface that forms the tread of the tire. It is not necessary that all of the lamellas of the vulcanization mold are embodied according the present invention. It is instead possible to employ a combination of the inventive lamellas with conventional lamellas of different types. It is especially preferred to employ the inventive lamellas in those mold areas which produce the positive shoulder patterns of the tire. In comparison to the lamellas disclosed in German Patent application 196 50 702 especially suitable for the central portion of the tire tread, the inventive sipes provide an especially high transverse force transmission which can be used with advantage in the shoulder area of the tire.

For the same reasons, the vehicle tires produced by employing the inventive lamellas must not be provided at all sipes with the negative pattern of the inventive lamellas.

The special feature of the inventive vehicle tire is that at least some of its sipes are provided with deformations in the form of depressions and/or projections arranged in such an areal repeating unit division, that all of the dividing lines are arranged in three different sets whereby within each set the dividing lines extend parallel to one another and whereby the dividing lines of different sets intersect one another at an angle of approximately 60° so that the dividing lines form a grid consisting of substantially equilateral triangles. Preferably, the deviations from the aforementioned ideal angle of 60° is smaller than 5°.

BRIEF DESCRIPTION OF THE DRAWINGS

The invention will be explained in the following with the aid of five embodiments I through V. The FIGS. 1 through 13 belong to embodiment I, the FIGS. 14 through 17 belong to the embodiment II, the FIGS. 18 and 19 refer to the embodiment III, the FIGS. 20 through 25 refer to the embodiment IV, and the FIGS. 26 through 37 refer to the embodiment V. Each one of the embodiments is represented with so many Figures in order to illustrate the complicated three dimensional design by showing the design at different angles. It is shown in:

FIGS. 26a through e in views true to scale and corresponding to ISO drawing standards an overview with centrally arranged frontal view FIG. 26c (i.e., after mounting of the lamella in a finished vulcanization mold in a view direction corresponding to the circumferential direction of the vulcanization mold), whereby FIG. 26b shows a view from the right, FIG. 26d shows a view from the left, FIG. 26a is a view from the bottom, and FIG. 26e shows a view from above, whereby this embodiment is a lamella similar to the embodiment shown in FIGS. 7 through 13 whereby however the arrangement of bending lines is rotated by 30°;

DESCRIPTION OF PREFERRED EMBODIMENTS

Figure 1:
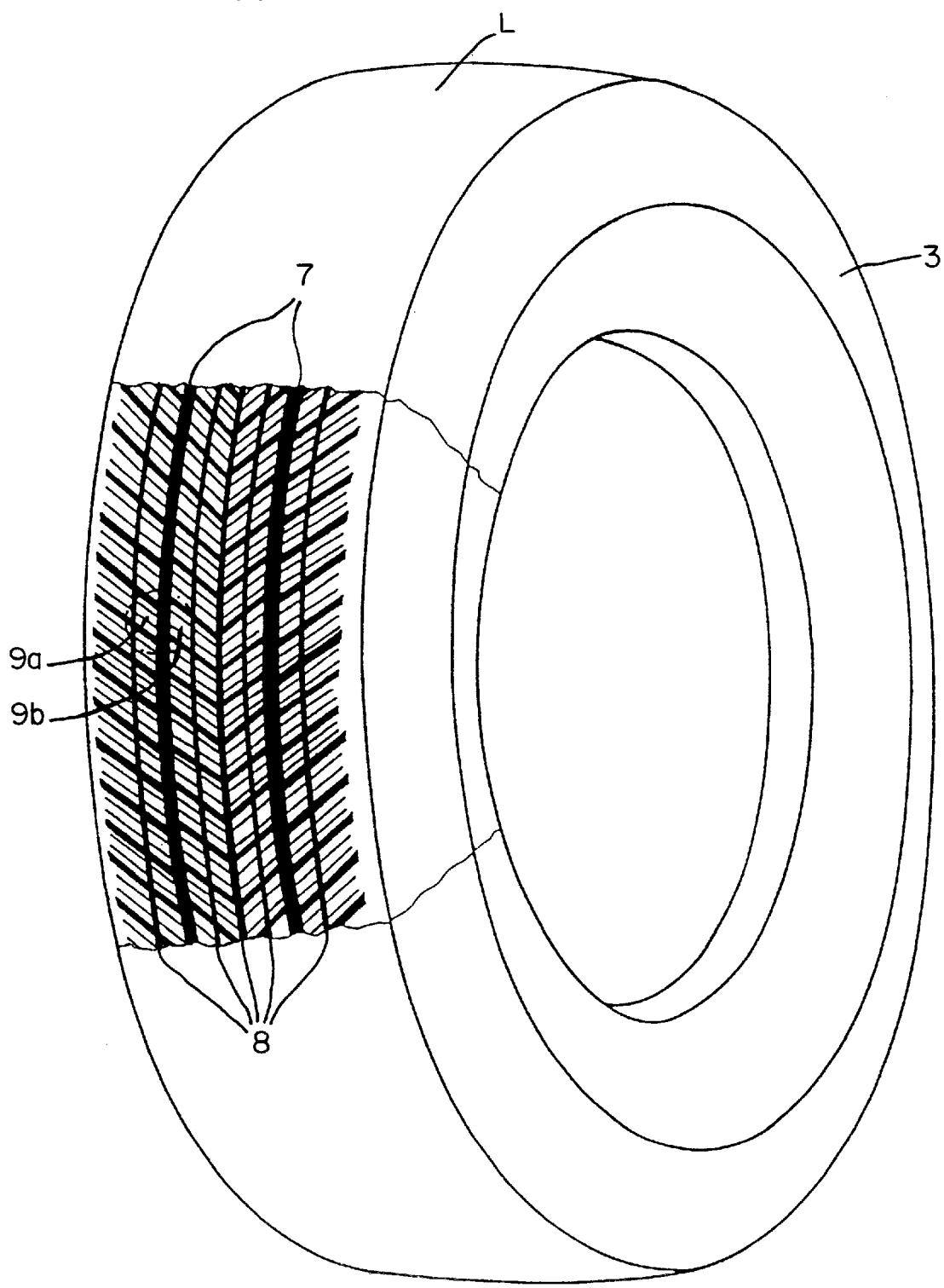
FIG. 1 a perspective view of the inventive vehicle tire.

FIG. 1 shows in a perspective view the inventive vehicle tire 3. The tread portion shown of the tire tread L is unidirectional due the axial symmetrical arrow design of the transverse grooves relative to the circumferential zenith line. Axially, this exemplary tread design is defined by two wide circumferential grooves 7 and 5 more narrow circumferential groove 8. Accordingly, the entire positive portion of the tread is in the form of blocks 9 delimited laterally (axially)

by the circumferential grooves 7 and 8 and above and below (circumferentially) by the transverse grooves 6.

The negative portions include, in addition to the aforementioned transverse grooves 6 and circumferential grooves 7 and 8, sipes 10. The shown exemplary design has two such sipes 10 arranged in each one of the blocks 9 so as to extend parallel to the transverse grooves 6. Of course, when having a pitch sequence with greater pitch ratios between the longest and the shortest pitch length, a greater number of sipes can be provided in the longer blocks than in the shorter blocks.

The present invention relates to sipes 10 whereby, however, not the design of these sipes 10 in the plan view as shown is of importance but its extension into the depth of the tire tread. In order to show the inventive features, a small portion of the tread plan view is indicated as a detail, and this detail is to be explained in the following with the aid of FIGS. 2 through 6.

Figure 2:
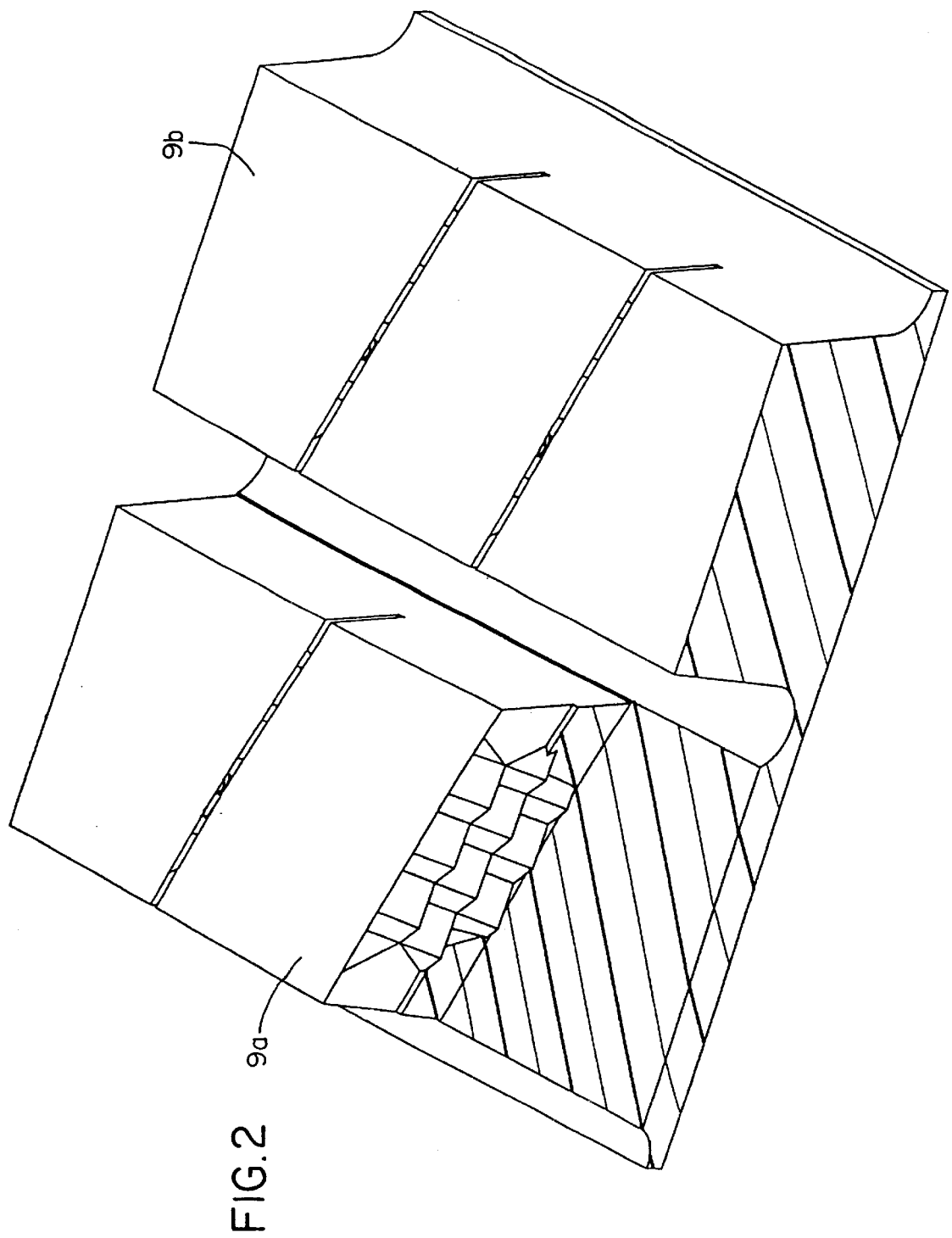
FIG. 2 in a perspective view from above and slightly from the right an enlarged representation of the tread of the tire according to FIG. 1, whereby a tread block to the left has been cut off in order to show an end view of the flank surface of the inventive sipe with alternating arrangement of depressions and projections.

FIG. 2 shows in a perspective view from above and slightly from the right an enlarged portion of the tire tread of the tire according to FIG. 1 whereby a tread portion to the left is shown in section in order to allow a view onto the flank of the inventive sipe with alternating arrangement of projections and depressions.

In order to have a clean border of the sectional surfaces to the left and to the right at the circumferential grooves 7 and 8, the section plane parallel to the tire periphery is slightly elevated relative to the deepest portion of the sipe bottom. This deepest portion is shown in dashed lines only in FIG. 6 in order not to overload the other Figures. Since in this embodiment the preferably pyramid-shaped deformations, i.e., a deformation that is based on a triangular base surface, do not extend into the non-represented deep section portion, this representation technique does not interfere with the disclosure of the inventive features.

Figure 3:
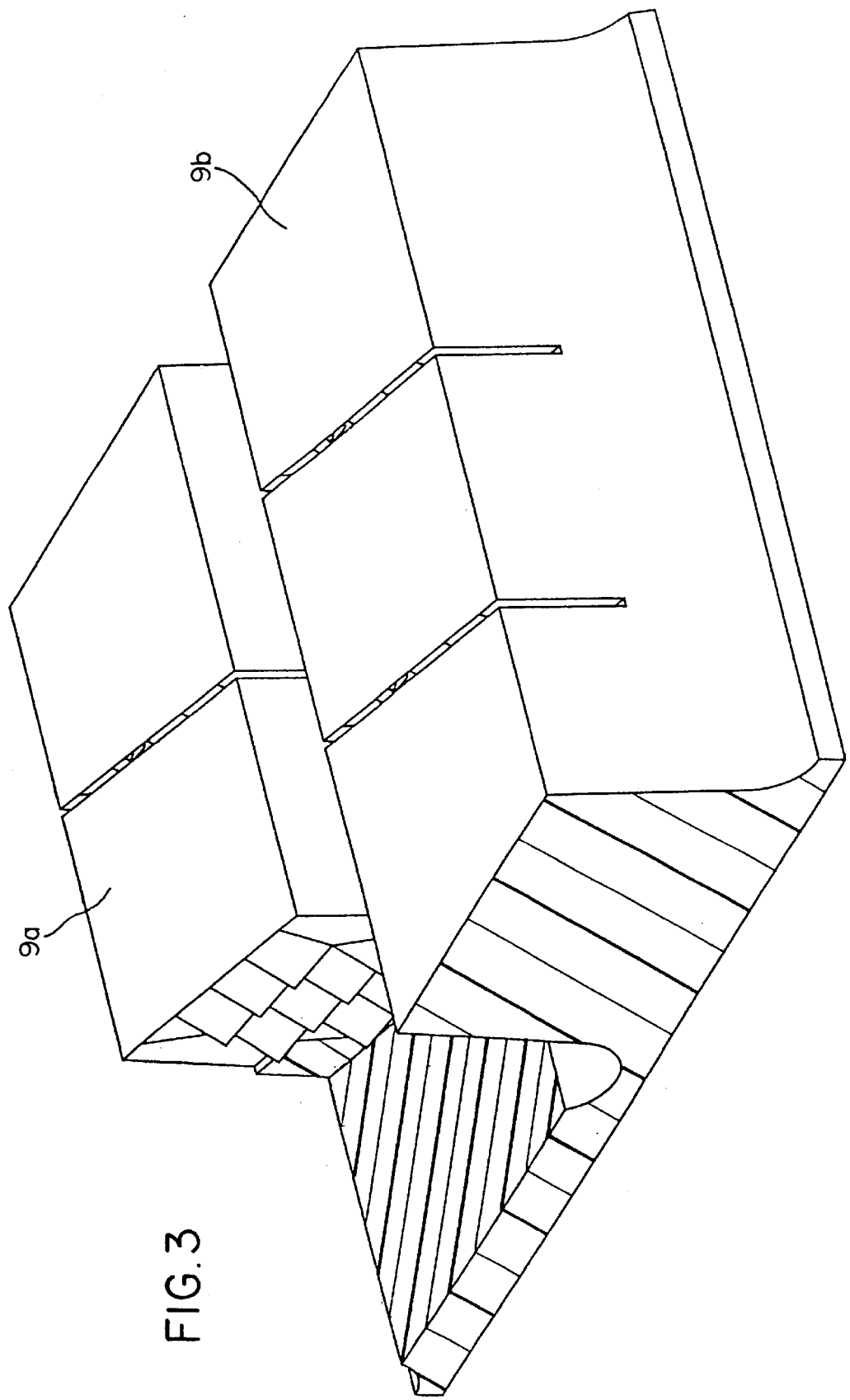
FIG. 3 the same section as FIG. 2 but at a different angle from above and further from right at the same scale as FIG. 2.
Figure 4:
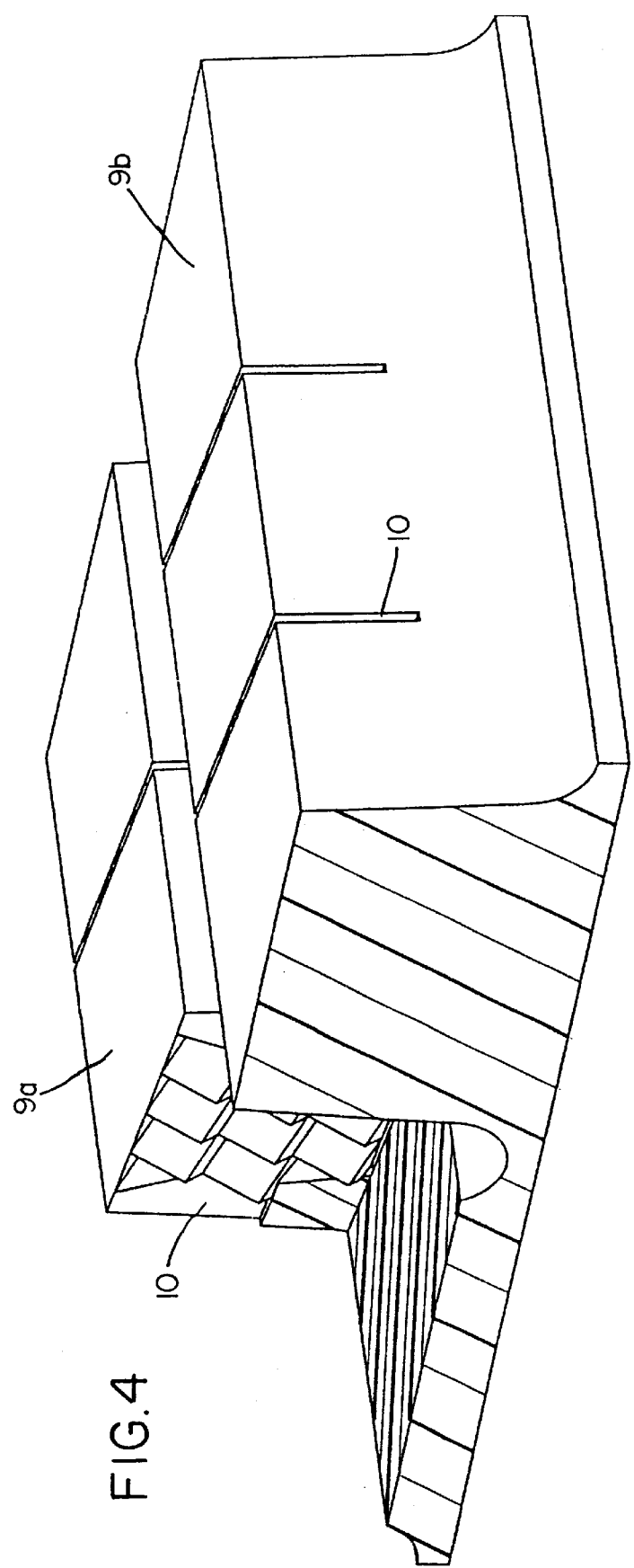
FIG. 4 at the same scale the section of FIG. 3 at a smaller angle from above.
Figure 5:
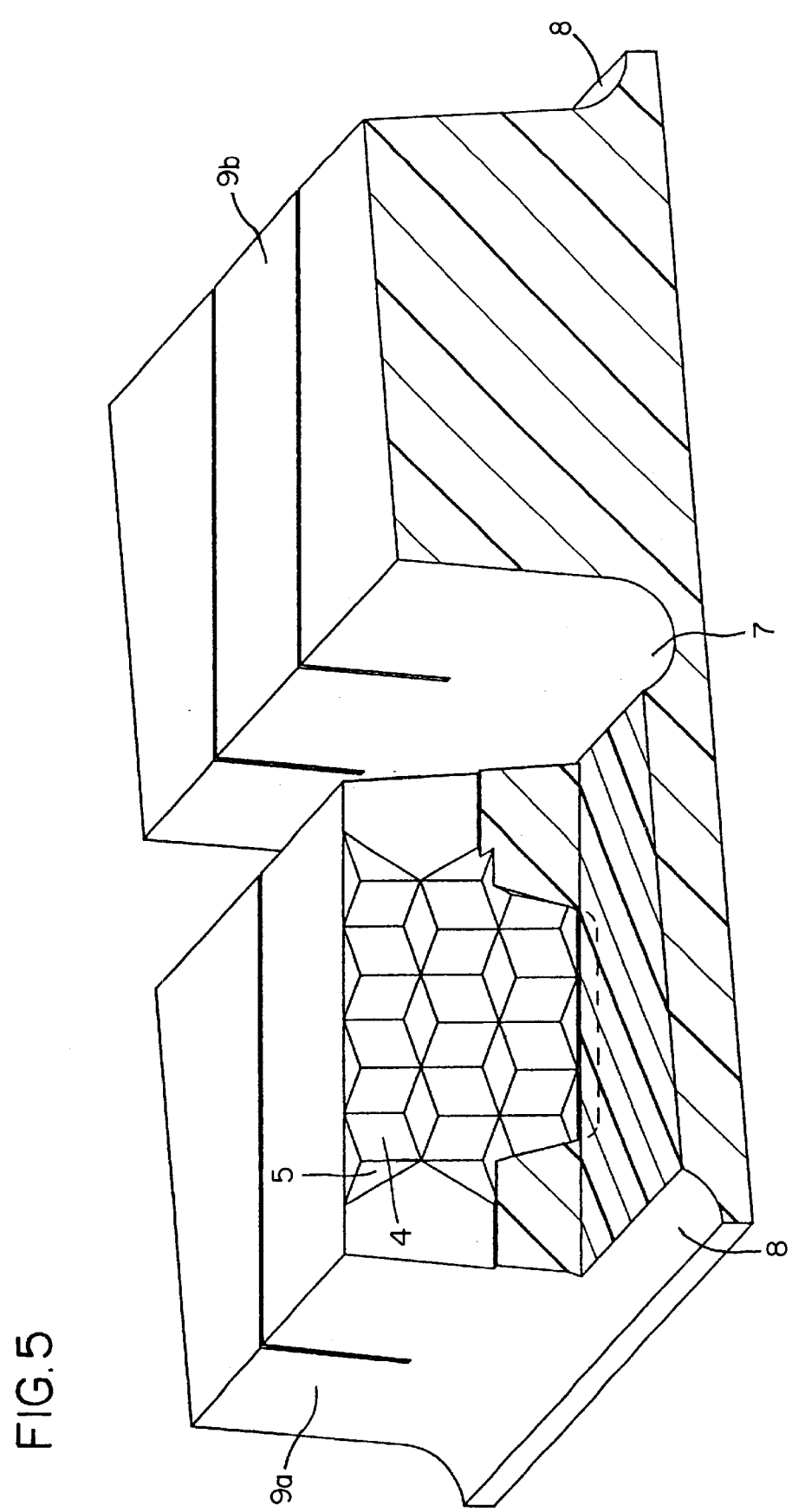
FIG. 5 at the same scale the same section as FIG. 2 at a smaller angle from above and from the left.

FIGS. 3 through 5 show at the same scale the same portion as FIG. 2, but with respectively different view angles, whereby FIG. 3 is shown in a view closer from above and further to the right than FIG. 2, FIG. 4 is shown even closer than FIG. 3 from above, and FIG. 5, relative to FIG. 2, is shown even closer from above and at an angle from the left instead of from the right.

Figure 6:
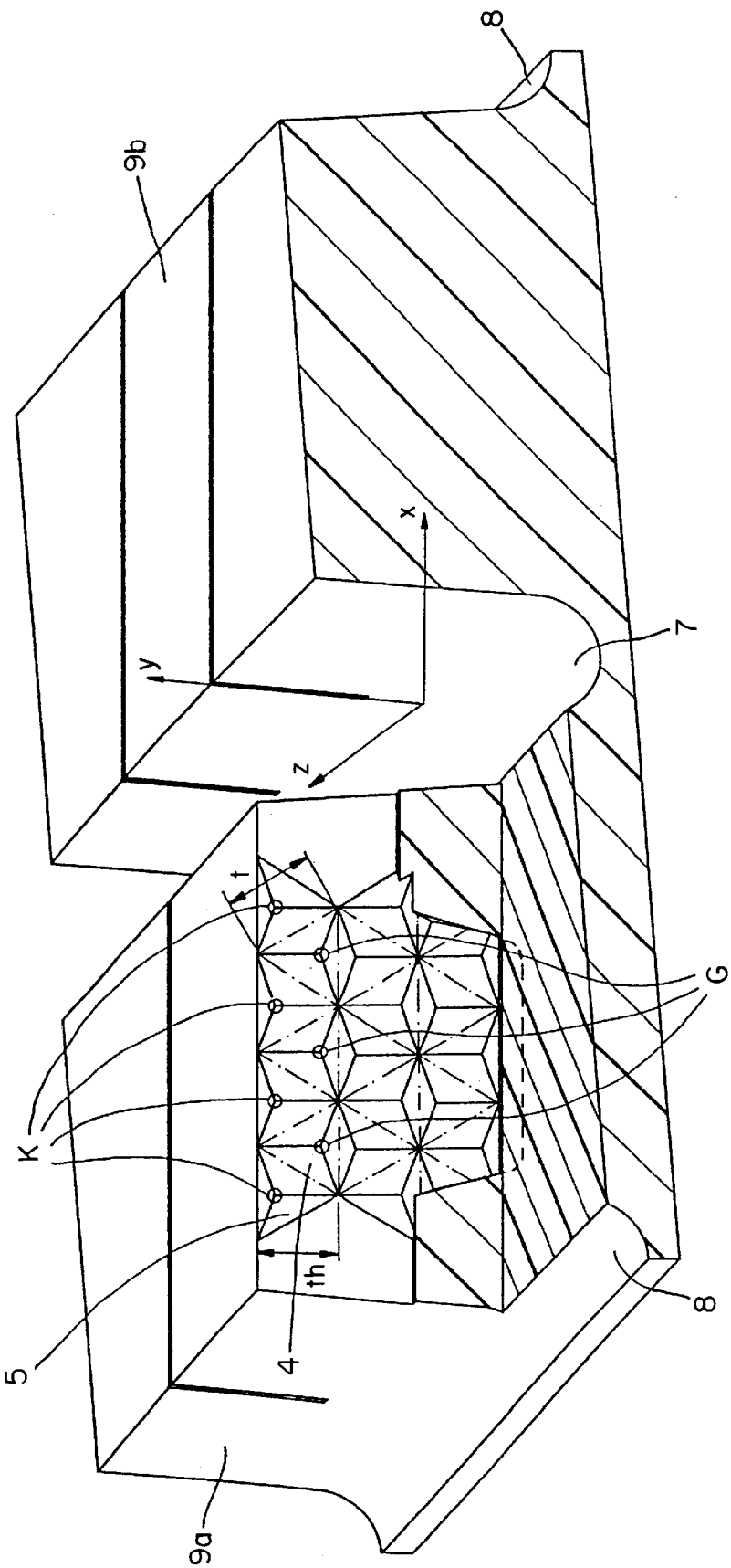
FIG. 6 the same view as FIG. 5 but with the dividing lines being shown in dash-dotted lines.

FIG. 6 shows the same as FIG. 5 but with a dash-dotted line showing the dividing lines T. Only these dividing lines T are positioned within the reference surface Z=0.

In order to illustrate the term "Z=0 reference surface", in the same section 10 of the block 9b shown adjacent to the sectioned block 9a the reference surface Z=0 is represented. It is defined by the radially extending Y-axis and the X-axis. The X axis extends through the left and the right end of the sipe, i.e., extends substantially in the axial direction of the tire.

The coordinate axis Z is arranged perpendicular to this X-Y plane, i.e., perpendicular to the Z=0 reference surface. If the X-axis were to extend exactly in the axial direction and the Y-axis exactly in the radial direction, then the Z axis would extend exactly in the tire circumferential direction. However, for reasons of noise emission, it is expedient to rotate the sipes about an angle between 5° and 40° out of the exactly axial direction. The noise-producing events, i.e., contact of the leading edge of the sipe and contact of the following edge of the sipe, is then no longer abrupt. Accordingly, in the inventive embodiment the sipes are also slightly slanted to the axial direction.

The Y coordinate is exactly positioned in the radial direction of the tire. However, it is also possible to position it substantially at an angle of 20°, as is known in the prior art, in order to provide a specialization with regard to grip between forward drive or deceleration.

There are two different dividing lengths. Where no other indication is given, the dividing length t is the spacing between points of interception along the respective dividing line T, as shown in FIG. 6. Only where the repeating units (period lengths) along the bisecting line is mentioned, the dividing length this the length of the respective bisecting lines within a triangular shaped pyramid base. When this pyramid base, as is preferred and shown in all of the Figures, is an exactly equilateral triangle, then the dividing length (th) is half the square root of three times the dividing length (t) between points of interception.

In FIGS. 2 through 6 it can be seen that the pyramid all the way to the left and radially outwardly, i.e., on the drawing sheet in the upper most left position, is a depression. The corresponding reference numeral 5 is only shown in FIG. 6, and this holds true for all reference numerals in order to allow with FIGS. 2 through 5 a realistic perspective impression of the design without being impeded by reference numerals and reference lines. The point-shaped or pointed extreme of the depression 5 is a crater K. In the same pyramid row the other craters are also indicated by reference letter K.

Aside from the lamella edge, each depression 5 has positioned adjacent to each of its three pyramid base lines, which, aside from half the material thickness of the lamella, coincide with the dividing lines T and therefore cannot be properly shown even at this level of enlargement, a projection 4 with a point-shaped or pointed extreme, a top G. Of course, when viewed in the opposite direction, adjacent to each of the projections 4 along each one of its three pyramid base lines a depression 5 with a point-shaped extreme, i.e., a crater K is located.

The interpretation of each one of the FIGS. 2 through 5 is envisioned such that the clearly marked FIG. 6 should be placed adjacent to it.

The shown elevation of the lateral base portions at the left and right edge at each one of the shown sipes is not required. According to newest developments, it is even preferred to eliminate such base elevations because the excellent intermeshing action of the inventively deformed sipe flanks relative to one another no longer requires such elevations for the desired excellent handling behavior of the tire and because they are disadvantageous with respect to loading of the lamellas for producing the sipes since such lamellas are less stiff in the area of their edges.

The FIGS. 7 through 13 (still relating to the first embodiment I) show the lamella 1 with which the sipes 10 are produced in the aforementioned FIGS. 2 through 6. The lamella is represented at an enlarged scale as compared to the sipes of FIGS. 2 through 6, whereby in FIGS. 7 a scale 1:8 is shown. In the other Figures, the scale and the sheet orientation has been selected such that the A4 format of the sheet has been optimally used.

Figure 7:
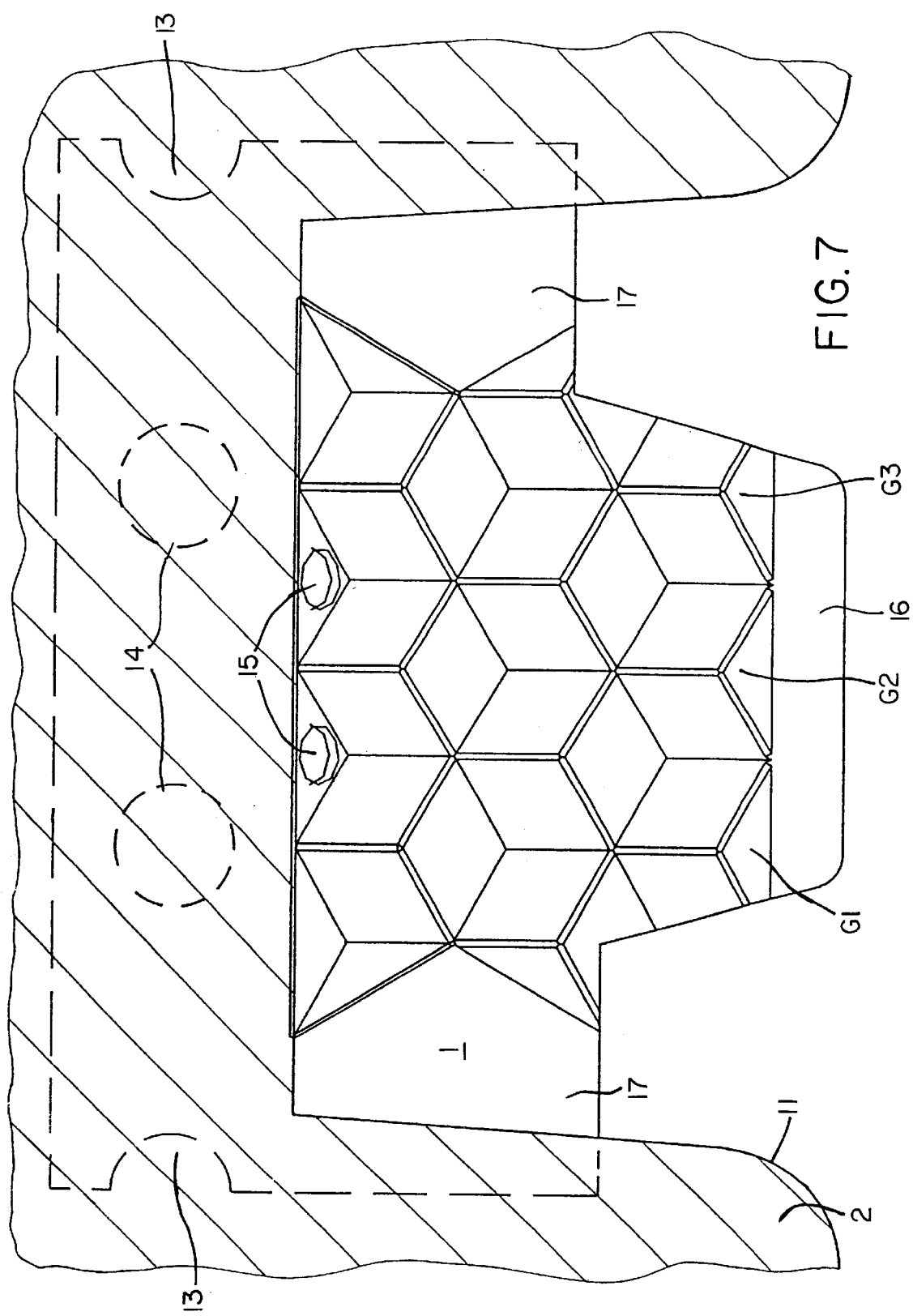
FIG. 7 in plan view, according to the view in the circumferential direction of the tire to be produced, at a greater scale than FIGS. 2 through 6 the inventive lamella with which the sipe illustrated in FIGS. 2 through 6 is produced.

In FIGS. 8 and 11 through 13, the periphery of the respective track-shaped portion of the vulcanization mold 2 is shown in thin solid lines 11 into which the lamella 1 is to be inserted. In FIG. 7 however, showing according to drawing standards a portion of the vulcanization mold 2 in section, this line is shown as a thick solid line. The portion with which the lamella 1 is anchored within the vulcanization mold 2 is thus shown in FIG. 7 only as a dashed contour because it is embedded in the material of the vulcanization mold.

The shown semi-circular recesses 13 increase in a manner known to a person skilled in the art the connecting stability of the lamella in the mold. Since the mold opening resistance after vulcanization after is very high because of the deformations of the lamella, the arrangement of further penetration bores 14 is recommended in order to reliably prevent rupture of the lamella. In order not to impair the illustration of the parts in the other Figures, such bores 14 are only shown in FIG. 7.

Radially outwardly at the lamella area penetrating into the rubber mixture of the tire tread, venting penetrations 15 are provided which serve, in a manner known to a person skilled in the art, to limit the number of required radially outwardly penetrating venting bores within the vulcanization mold.

FIG. 7 shows in a plan view, corresponding to the view perpendicular to the X-Y-plane, i.e., in the Z direction, and thus approximately in the circumferential direction of the tire to be produced, the inventive lamella 1. In the radial inner area 16 as well as in the two axial edge areas 17, the lamella is of a smooth design, i.e., without deformations. In the area enclosed by areas 16 and 17, the deformations of the inventive kind are provided.

Figure 8:
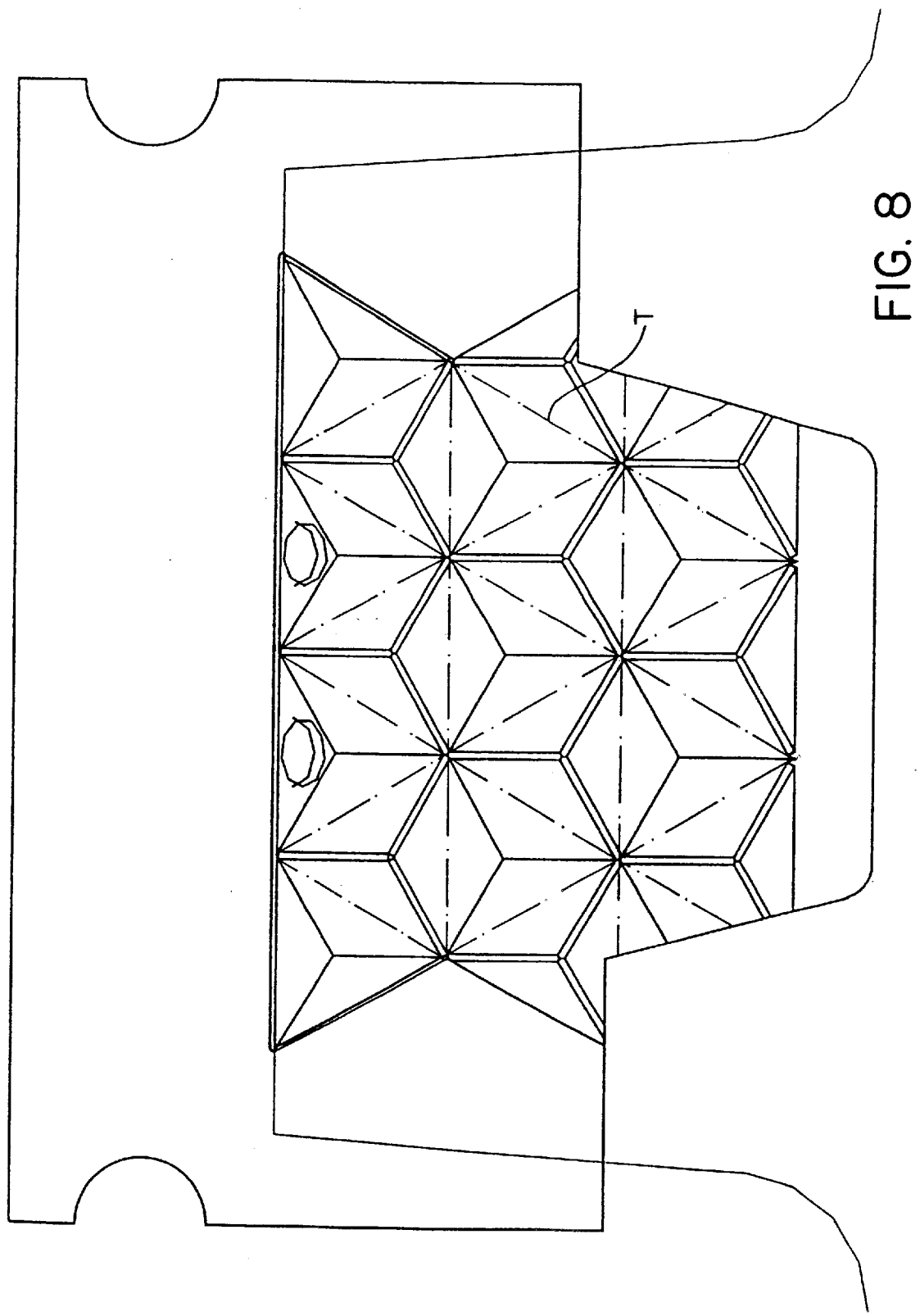
FIG. 8 the same view as FIG. 7 with dash-dotted lines showing the dividing lines.

FIG. 8 shows the same as FIG. 7, but in FIG. 8 all of the cross-hatched portions, the penetration bores 14, and the aforementioned reference numerals or letters are removed in order to show the inventive features more clearly. For the same purpose, the dividing lines T are shown in a dash-dotted line.

With a representation at such a scale, it can now be shown in detail that the outer side of the bending locations have a bending radius that is at least identical to the thickness of the sheet metal of the lamella. At the inner side the bending radius is substantially smaller, i.e., it is so small that even at the shown scale in the drawing produced by CAD there still cannot be a double line detected.

Figure 9:
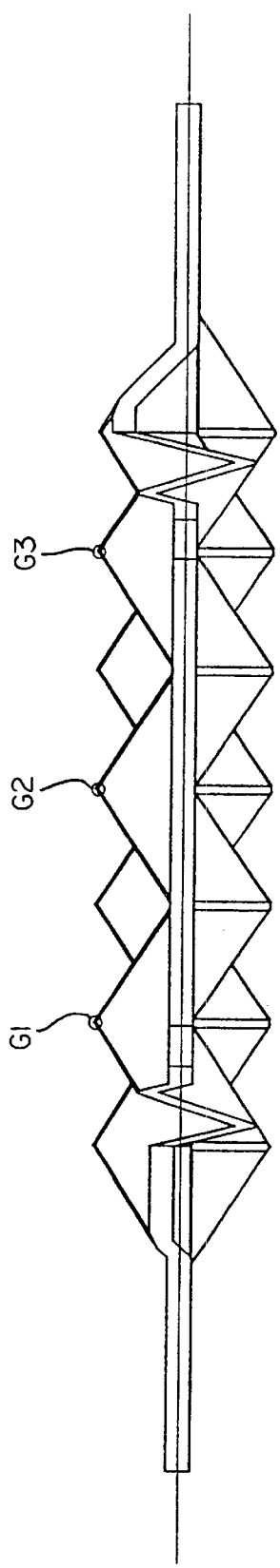
FIG. 9 in an end view, according to a view in the radial direction from the interior to the exterior of the mold toward the inner chamber wall of the inventive vulcanization mold, the same lamella at the same scale as in FIGS. 7 and 8.
Figure 10:
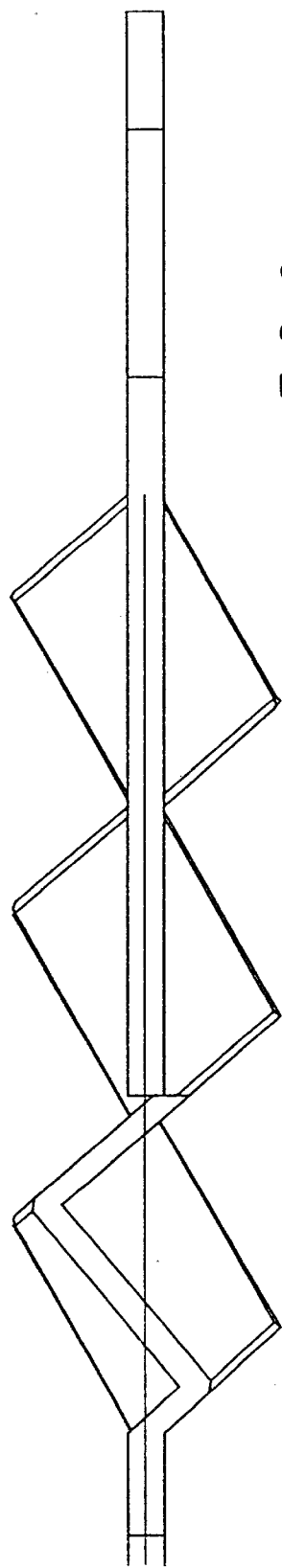
FIG. 10 in an end view perpendicular to FIG. 9, corresponding to the view in the axial direction from the left to the right of the inventive vulcanization mold, the same lamella at the same scale as in FIGS. 7 through 9.

Accordingly, in FIGS. 7, 8, 11, 12, and 13 the projecting edges can be seen as double lines while the receding edges are shown as single lines. The identification of tops and craters thus is not needed. In FIGS. 9 and 10, however, this does not allow a proper correlation because some lines, due to the very flat view angle, run into one another. In order to clearly show which portions are projecting and which are receding, reference letters showing the tops G and craters K are used.

FIG. 9 shows the lamella 1 in an end view in the radial direction i.e., from the interior of the mold in a radially outer direction toward the wall of the inner chamber of the inventive vulcanization mold. The tops G are shown at the top side of the drawing.

The tops G1, G2, and G3 are identified in order to show the connection to the plan view according to FIG. 7 where the same tops are indicated with same reference numerals. At the lower portion of the drawing, the craters K can be seen.

FIG. 10 shows in view perpendicular to the end view of FIG. 9 and corresponding to a view in the axial direction from the left to the right of the inventive vulcanization mold, the same lamella at the same scale as FIGS. 7 through 9. This drawing illustrates the difference to the zigzag or wave-shaped course of plan view contours or section lines of prior art lamellas that are based on a quadrangular contour within the Z=0 reference surface. In the present invention, the semi-waves, in general, do not appear axis-symmetrical to the perpendicular line onto the Z=0 reference surface extending through its extreme. According to the present invention there are only three section orientations in which such an axial symmetry can be observed, i.e., the three bisecting lines of the three sets of dividing lines. In the shown embodiment these are the radial line (see FIG. 9), the axis pivoted by 120° to the left, and the axis pivoted by 120° to right from the radial line. In the prior art deformations, having a contour in the Z=0 reference surface based on rectangles or diamonds as an elementary cell (smallest unit), the axial symmetry is present in each one of the section orientations of each extreme.

Figure 11:
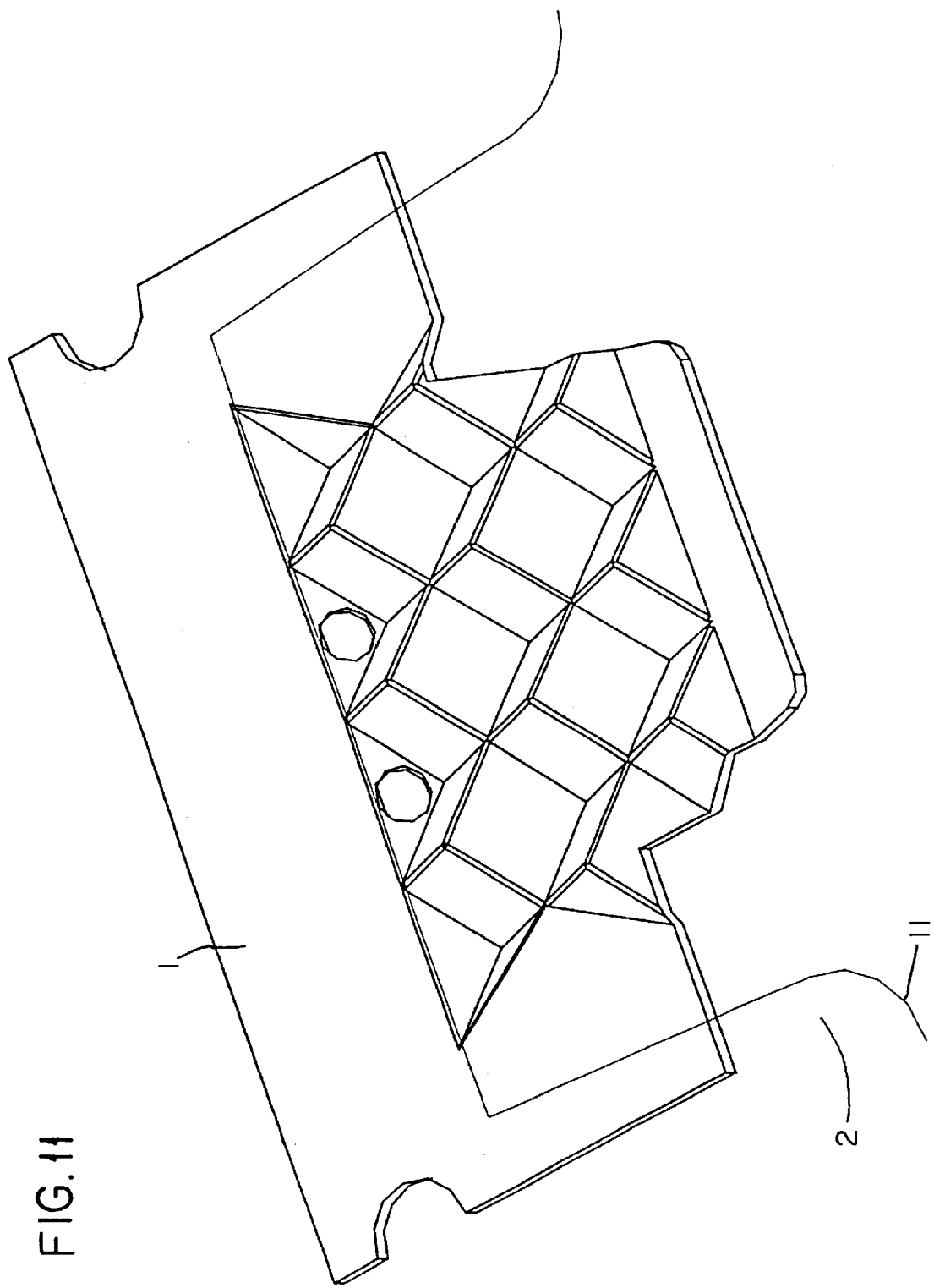
FIG. 11 the same lamella in a perspective view similar to the view angle of FIG. 7, but slightly turned radially outwardly and slightly turned to the right.

FIG. 11 shows the same lamella in a perspective view according to the view angle of FIG. 7, however, not precisely in the circumferential direction of the tire to be produced but slightly from radially inwardly to radially outwardly and slightly from the left to the right. There are hardly any reference numerals shown and there are no other auxiliary lines shown with the exception of the contour line 11 of the vulcanization mold 2 in order to be able to concentrate entirely on the special design of the lamella.

Figure 12:
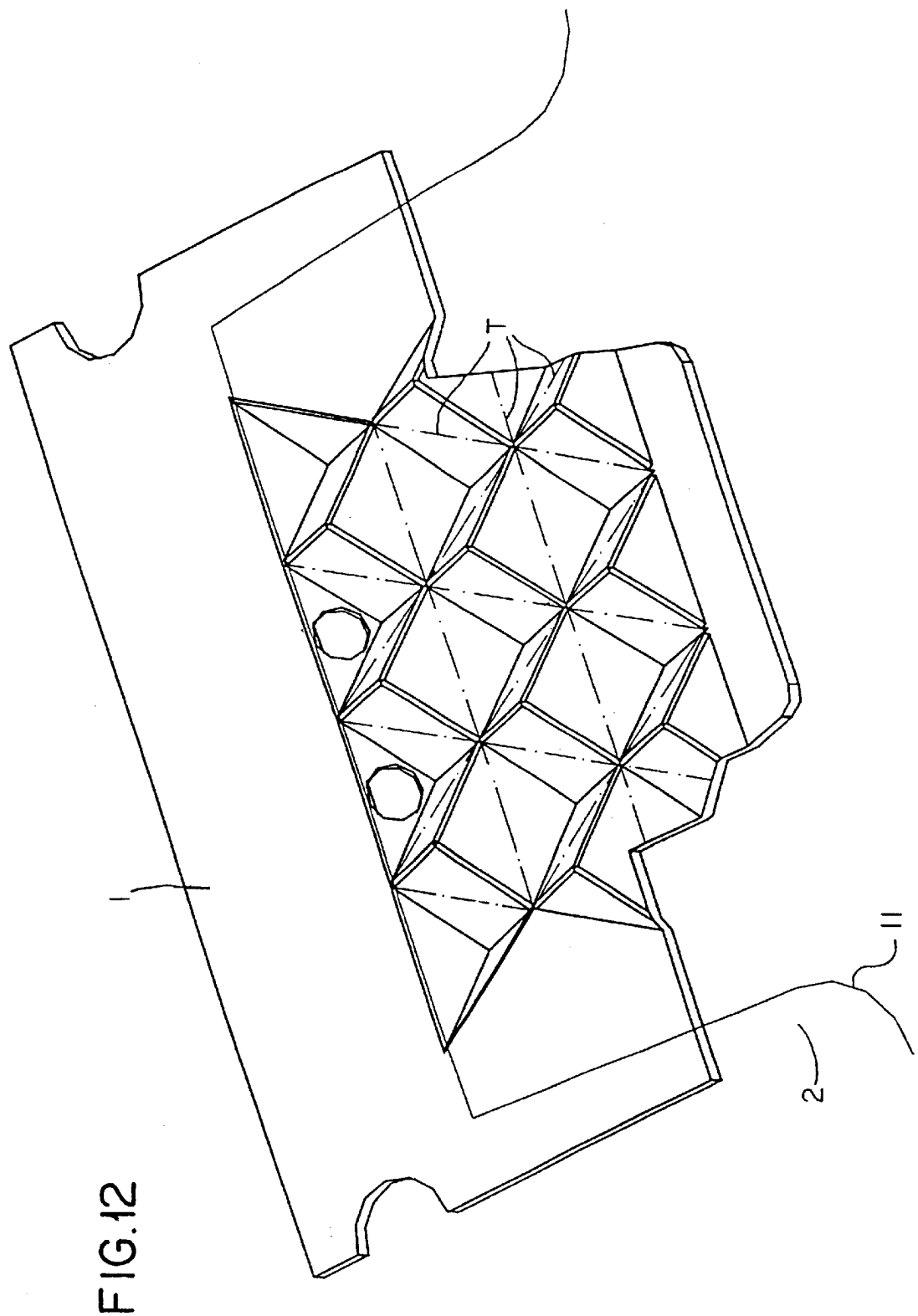
FIG. 12 the same lamella as FIG. 11 but indicating with dash-dotted lines the dividing lines.

FIG. 12 shows the same as FIG. 11 but with a dash-dotted indication of the dividing lines T.

Figure 13:
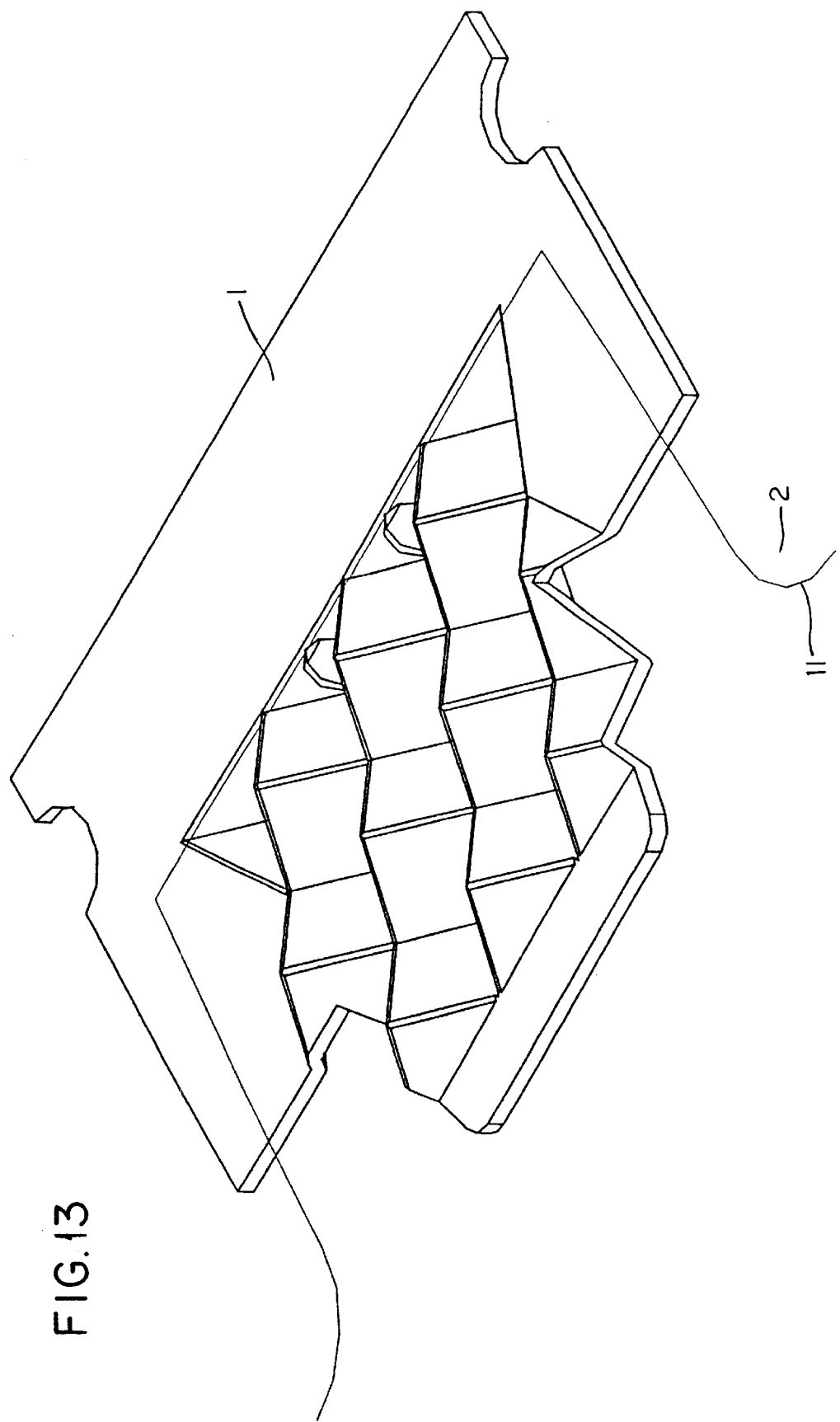
FIG. 13 similar to FIG. 11 the same lamella in a perspective view but turned more to the radial outer side and viewed from the right to the left.

FIG. 13 shows similar to FIG. 11 the same lamella 1 in a perspective view but turned to a greater extent to a radially outer direction and shown at a flatter angle from the right to the left. Accordingly, the craters are now covered by the projections. In analogy to FIG. 11, the lamella area in the center of the image, characterizing the invention, is free of additional dividing lines and reference numerals.

The embodiment II will now be discussed in more detail.

Figure 14:
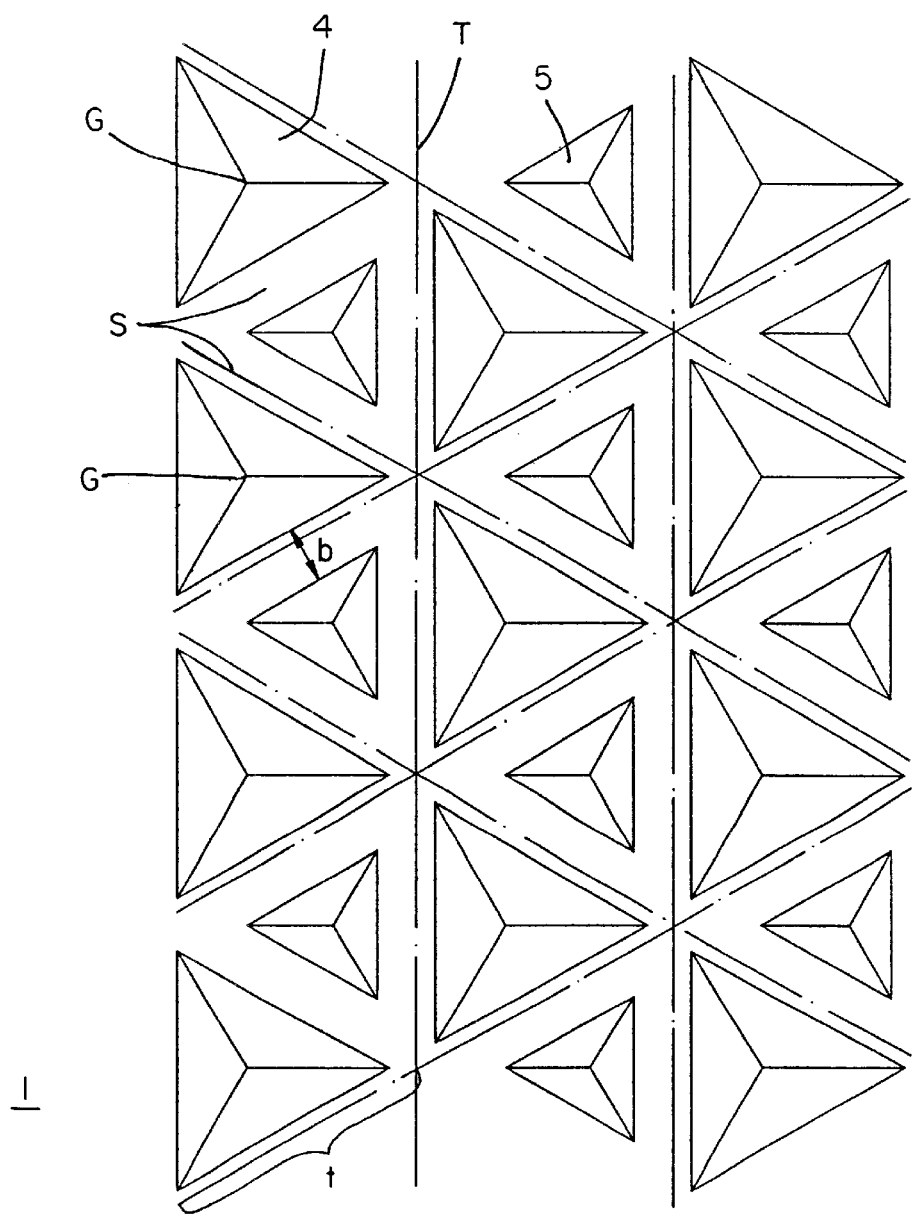
FIG. 14 in a plan view, corresponding to a view in the circumferential direction of the tire to be produced, another inventive lamella with alternating depressions and projections wherein between all neighboring deformations substantially within the Z=0 reference plane stays are provided.

FIG. 14 shows in a plan view, i.e., in a direction approximately in the circumferential direction of the tire to be produced, another inventive lamella 1 having also alternating projections 4 and depressions 5 which, in deviation from the previous Figures, have between neighboring deformations stays S of a width b which are not deformed and extend substantially in the reference plan Z=0. All of the following Figures show this feature.

This embodiment has retained the feature that the projections 4 as well as the depressions 5 are pyramid-shaped. In order to show the essential parts of the invention, the actually required rounding of the edges, especially of the projecting edges, is not shown.

It would be possible to use, instead of the shown complete pyramids with their point-shaped tops G and point-shaped craters K, truncated pyramids as the projections and/or the depressions so that the otherwise point-shaped tops are now an areal triangular plateau, such as a mesa in geography, and the otherwise point-shaped craters are in analogy formed as areal triangular valley bottoms. The top and crater points are thus no longer real bodily embodiments, but are only the points of alignment of the trapezoidal pyramid mantle surfaces. For this reason, the respective deformations no longer are said to have a point-shaped extreme, but are said to have correlated therewith such a point-shaped extreme. The imaginary point-shaped extreme is thus to be included in the inventive features. Such an embodiment would be similarly well suited for engagement of the sipe flanks, but would have the advantage that the removal of the vulcanized tire from the vulcanization mold would be less difficult. Such embodiments are also to be included in the present invention because they are also based on the inventive principle in that in the Z=0 reference surface a framework is provided with the elementary unit of triangles instead of quadrangles.

In the following FIG. 14 will be explained in more detail. The projections 4 are slightly greater than the depressions 5 in order to show that the reference surface Z=0, within which the dash-dotted dividing lines T and the stays S are positioned, are not exactly centrally arranged between the tops and the craters of the deformations. Accordingly, the dividing lines T are not precisely centrally positioned within the stays S that function as framework trusses.

Even for pyramid extensions of substantially the same size to the front and to the rear, this impression would result as soon as the lamella wall thickness is no longer negligible with respect to the dividing length t.

Figure 15:
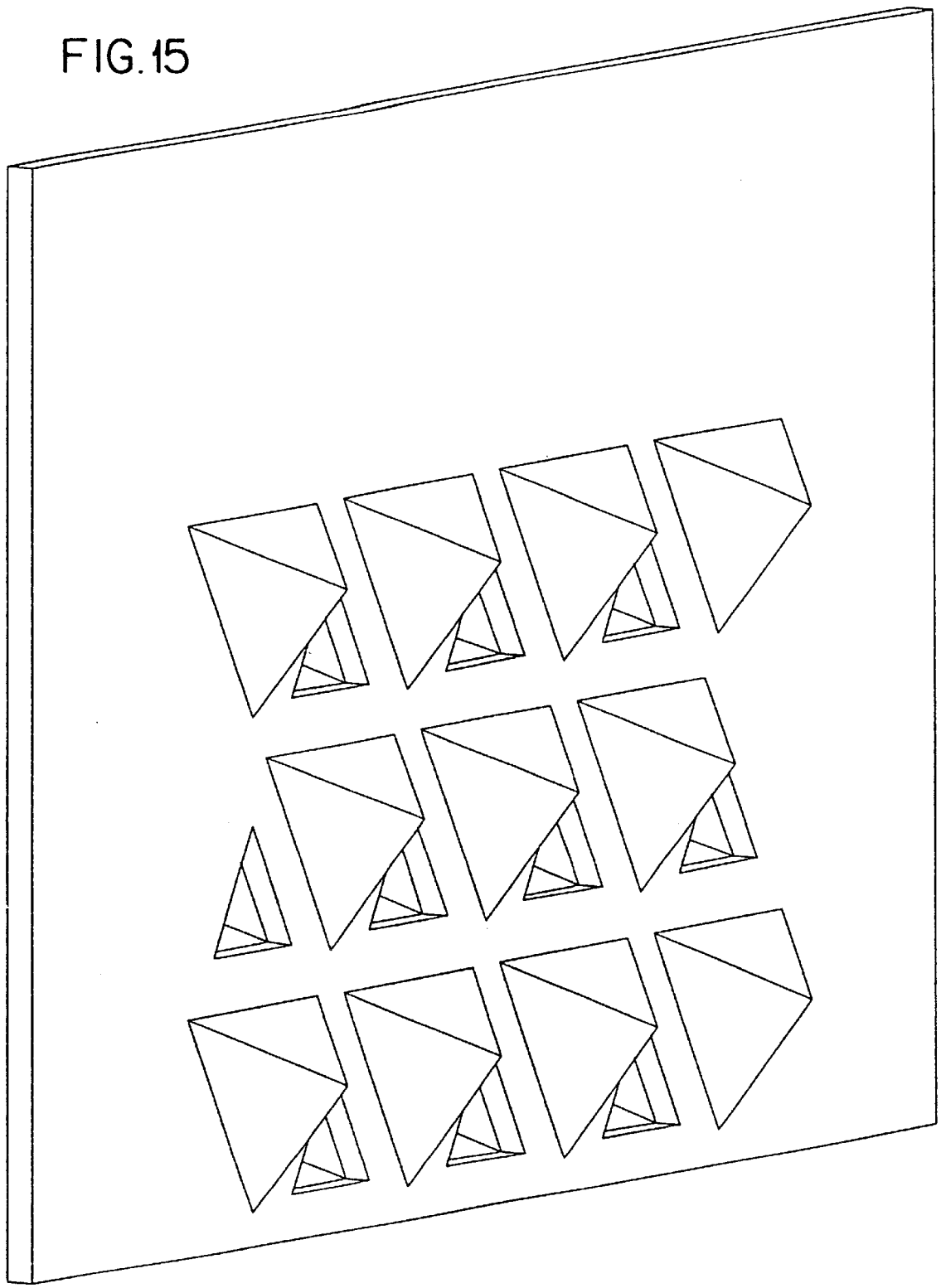
FIG. 15 the same lamella as in FIG. 14, but perspectively in a view slightly from radially outwardly and slightly from the left.
Figure 16:
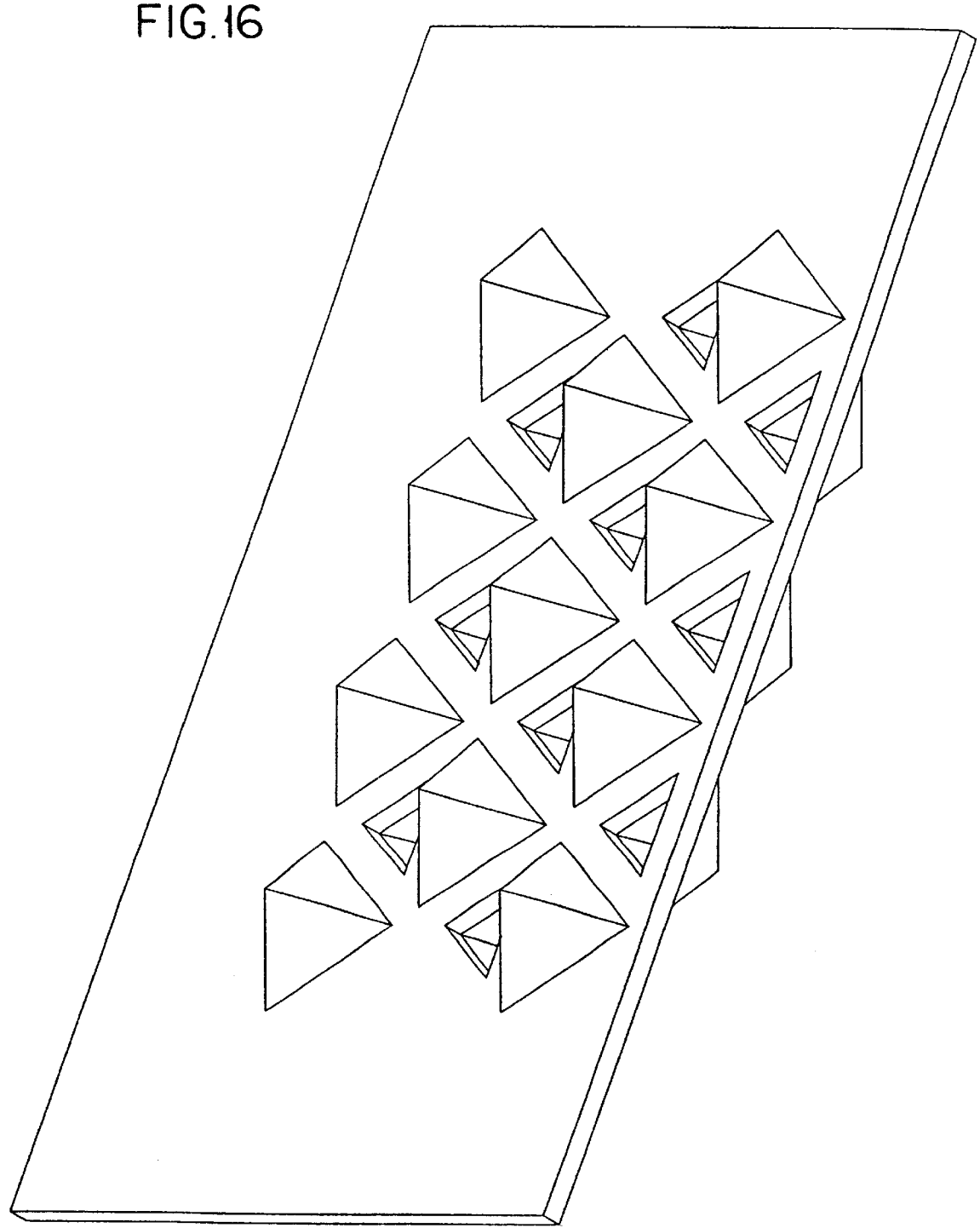
FIG. 16 the same lamella as in FIG. 14, but perspectively at an angle viewed from radially inwardly and slightly from the left.
Figure 17:
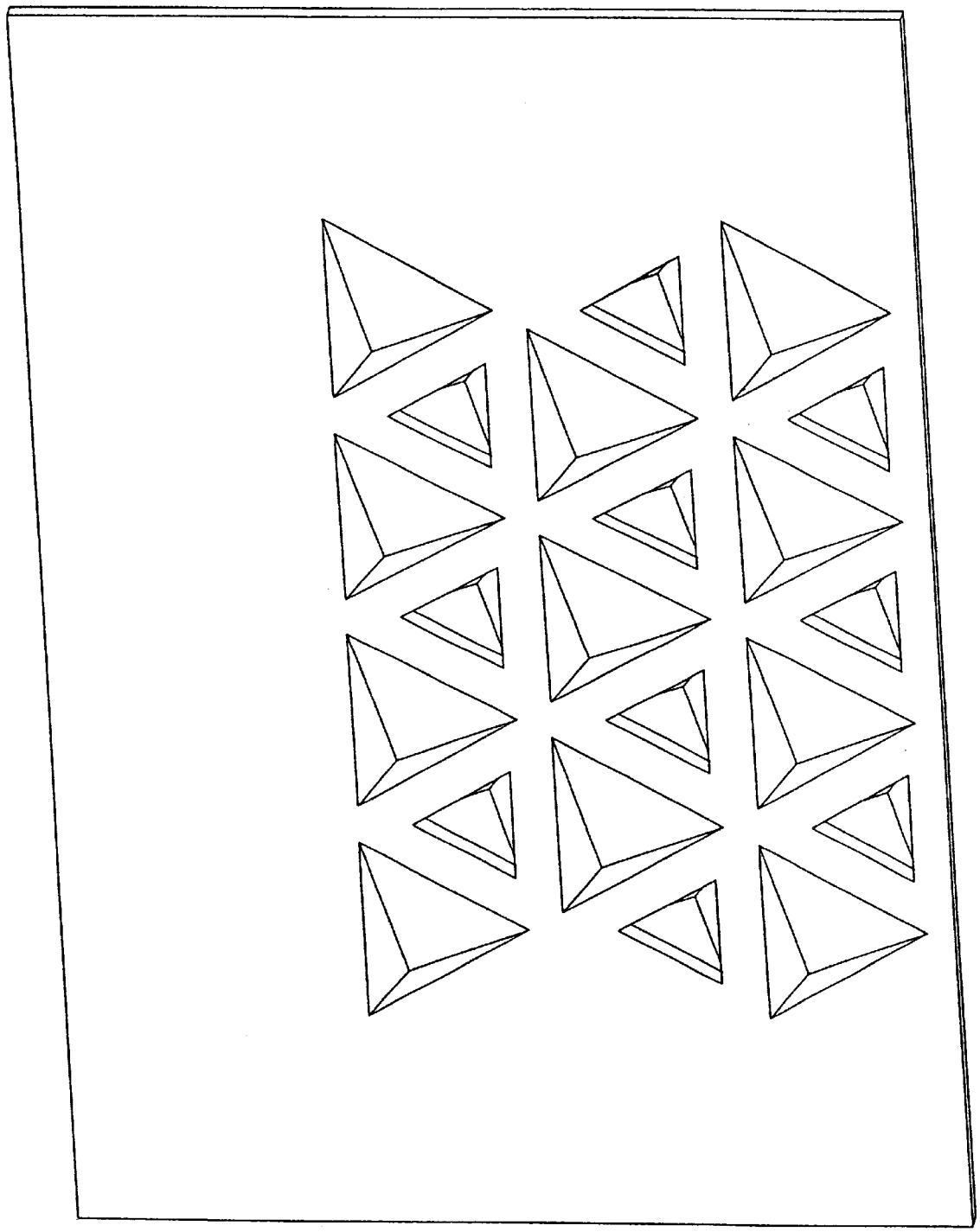
FIG. 17 the same lamella as in FIG. 14, but perspectively at an angle viewed from slightly radially inwardly and slightly from the right.

FIGS. 15 through 17 show the same lamella 1 as FIG. 14, but perspectively viewed in different directions and without showing the dividing lines t. FIG. 15 is shown at an angle slightly from radially outwardly and slightly from the left; FIG. 16 is a view from radially inwardly and slightly from the left; and FIG. 17 is a view slightly from radially inwardly and slightly from the right. In this embodiment II, as well as in the following two embodiments, no lamella base elevation is provided. The lamella base, which is shown at the upper area of the drawing sheet, is without typical fastening details in this drawing since in the embodiment I these fasteners have been sufficiently disclosed so that only the inventive features are shown in these drawings.

Figure 18:
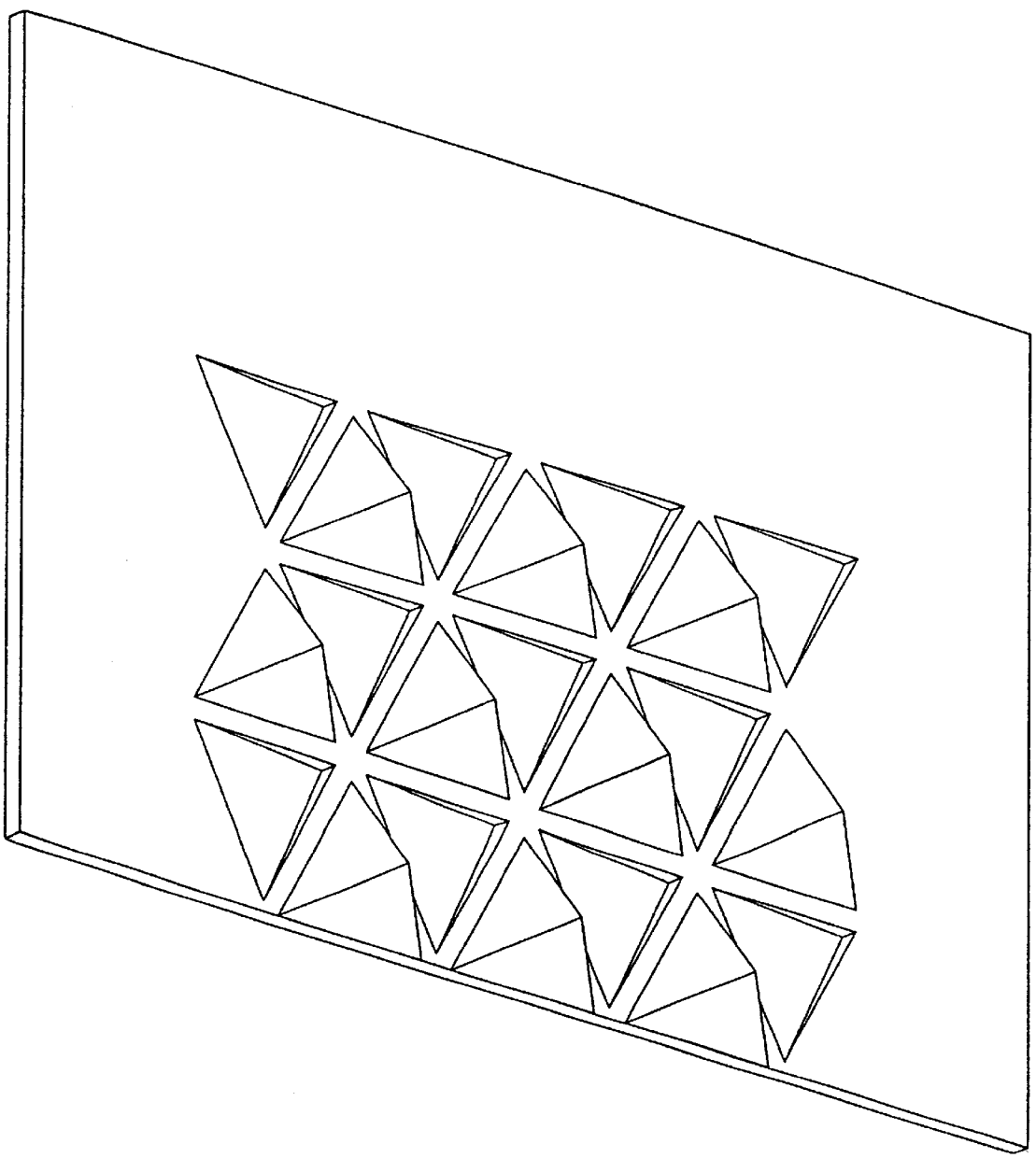
FIG. 18 in a perspective view a variant of FIGS. 14 through 17, wherein all deformations are oriented in the same direction so as to appear as projections.
Figure 19:
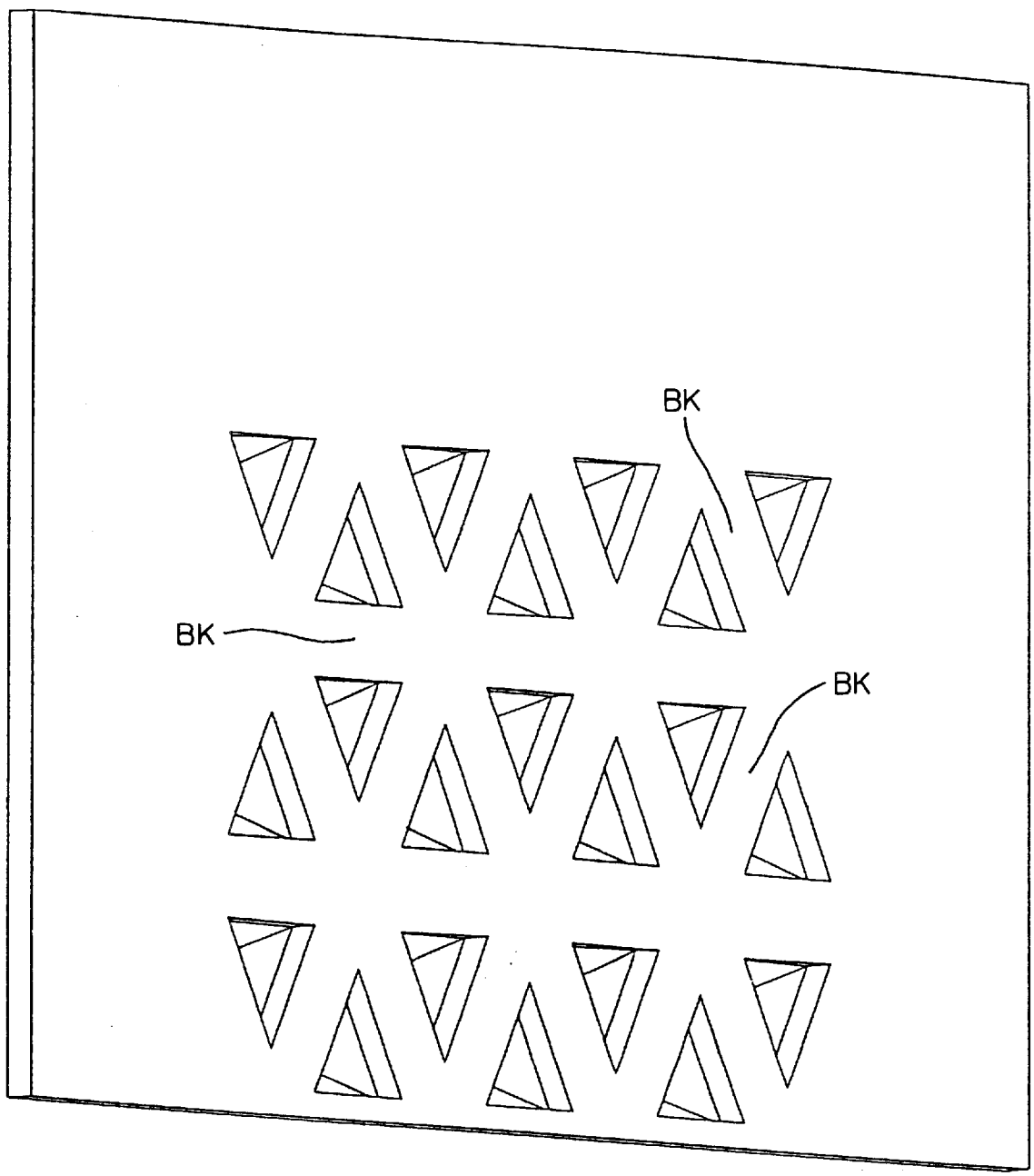
FIG. 19 a perspective view from behind, i.e., with an inverted circumferential directional component, showing the backside of the lamella represented in FIG. 18 so that all deformations are now shown depressions.

Based on this embodiment II, a third embodiment III is shown in FIGS. 18 and 19. The pyramids are all of the same size and the previously inverted pyramids are now shown as projecting pyramids. In this embodiment there is thus only pyramids projecting "positively" from the Z=0 reference surface. In comparison thereto, the centrally arranged stays S are thus line-shaped depressions.

FIG. 18 shows the thus modified lamella 1 in a perspective view at an angle from the front, while FIG. 19 shows a view from behind so that in this drawing all pyramids are shown as depressions. Accordingly, in FIG. 19 all of the inventive triangular framework stays are shown as crests BK.

Figure 20:
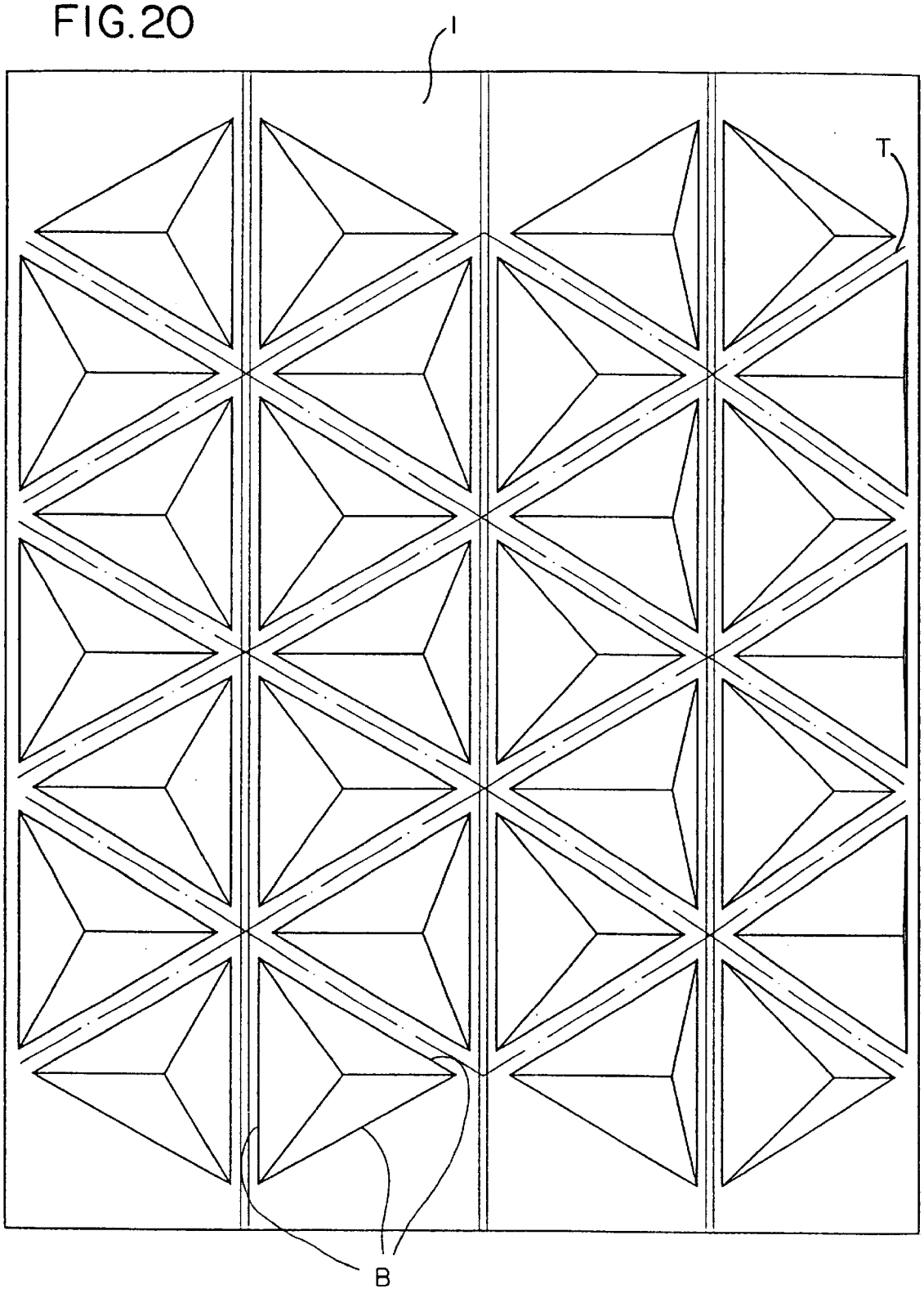
FIG. 20 an angled lamella with deformations in a single orientation whereby the strip all the way to the left is shown in a frontal view, corresponding to a view substantially in the circumferential direction in the thus finished tire.

FIGS. 20 through 25 show embodiment IV. While keeping the feature of the embodiment III, which is an elected but not a required feature according to which all deformations have the same orientation, an angled lamella 1 is now shown which is thus no longer planar. In FIG. 20, the strip all the way to the left is shown in a frontal view, according to a view substantially in the circumferential direction of the finished tire.

The Z=0 reference plane which contains the dividing lines T (represented only in FIG. 20) is thus no longer a planer but is angled along the dividing lines of one of the three sets. This angled design serves as a special stabilization of the otherwise substantially planar stable framework of the stays S. The thus produced edges should extend substantially in the radial direction of the vulcanization mold to be provided with these lamellas and, of course, of the thus produced tire.

The base lines B of the pyramids are again symmetrical to the respective dividing line T and limit the stays S laterally.

Figure 21:
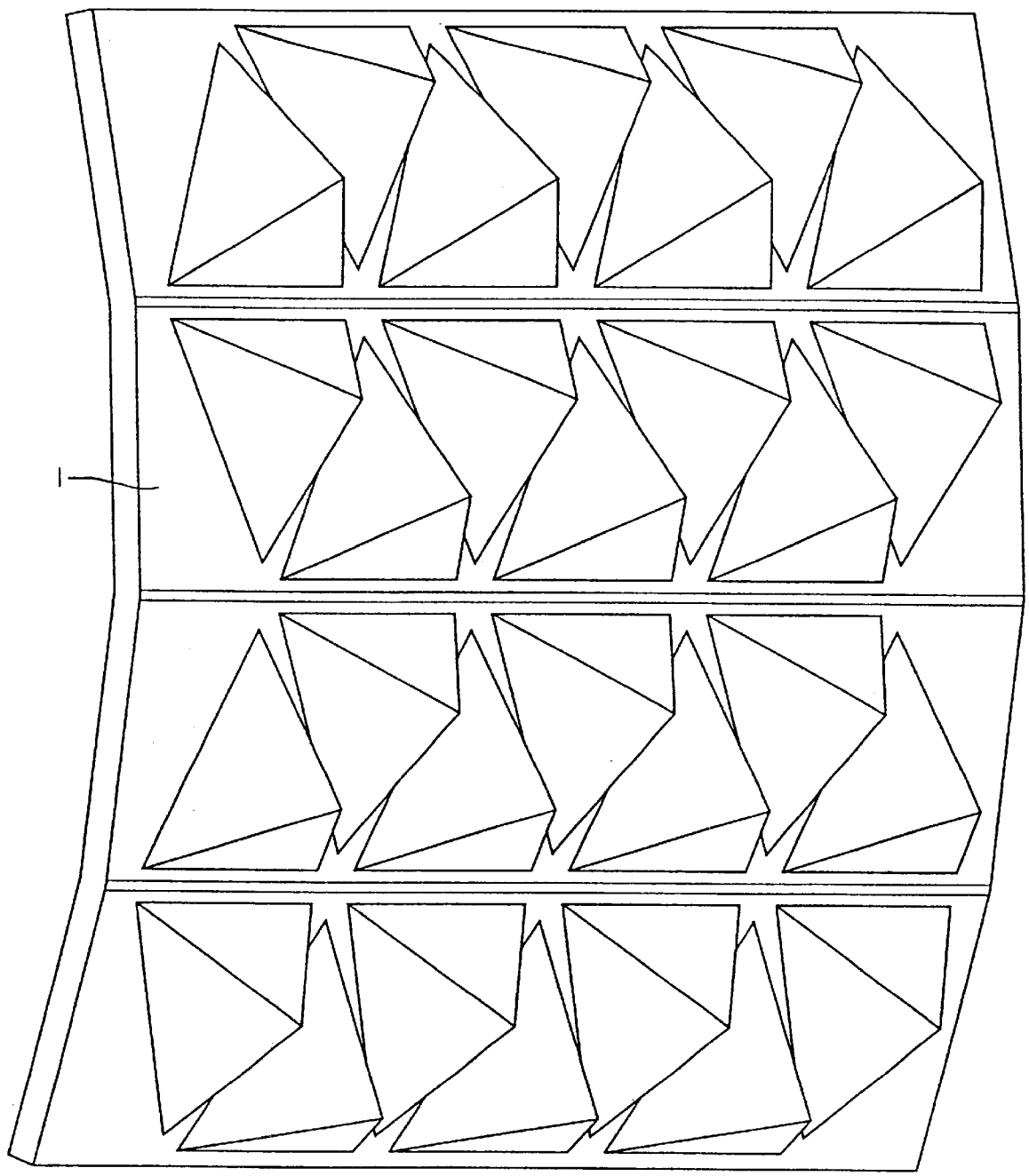
FIG. 21 the same lamella as that of FIG. 20 in a more radial view.
Figure 22:
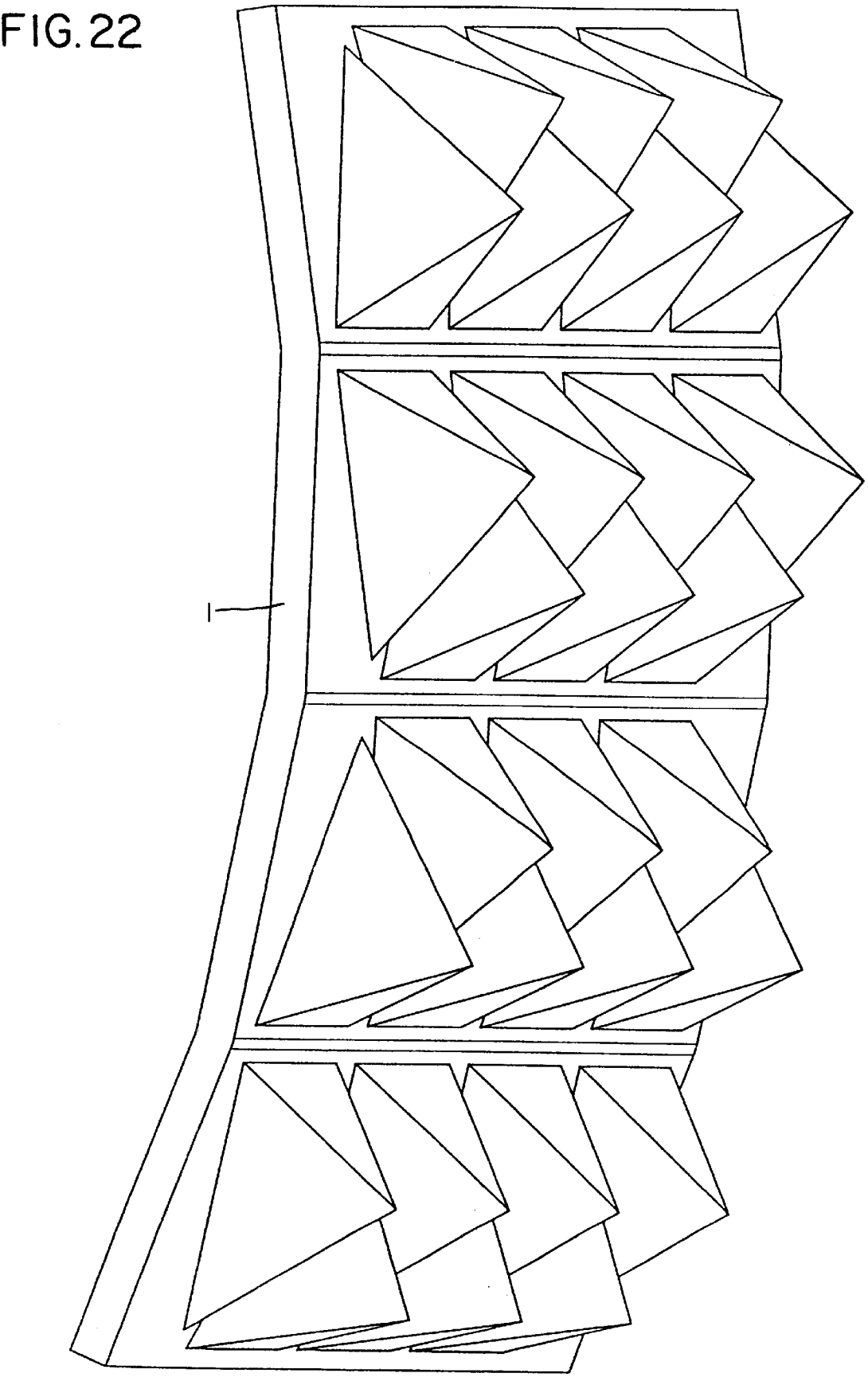
FIG. 22 the same lamella as FIG. 21 but in an even more radial view.
Figure 23:
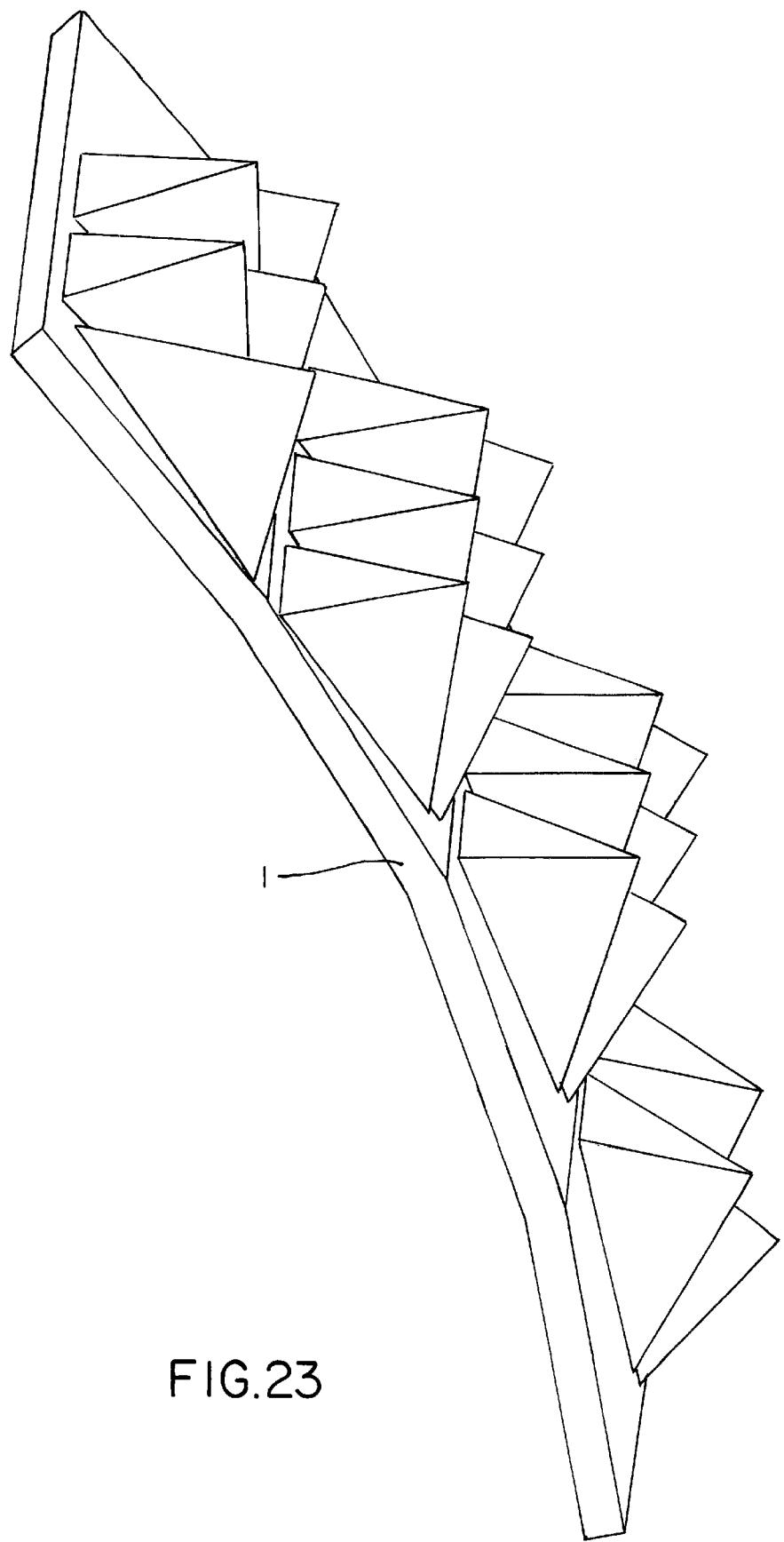
FIG. 23 the same lamella as FIG. 22 but in an even more radial view and somewhat from the left.

FIG. 21 shows the same lamella 1 as FIG. 20 in a more radial orientation; FIG. 22 shows the same lamella in an even more radial direction; FIG. 23 shows the same lamella as FIG. 22 in an even more radial orientation and slightly from the left.

Figure 24:
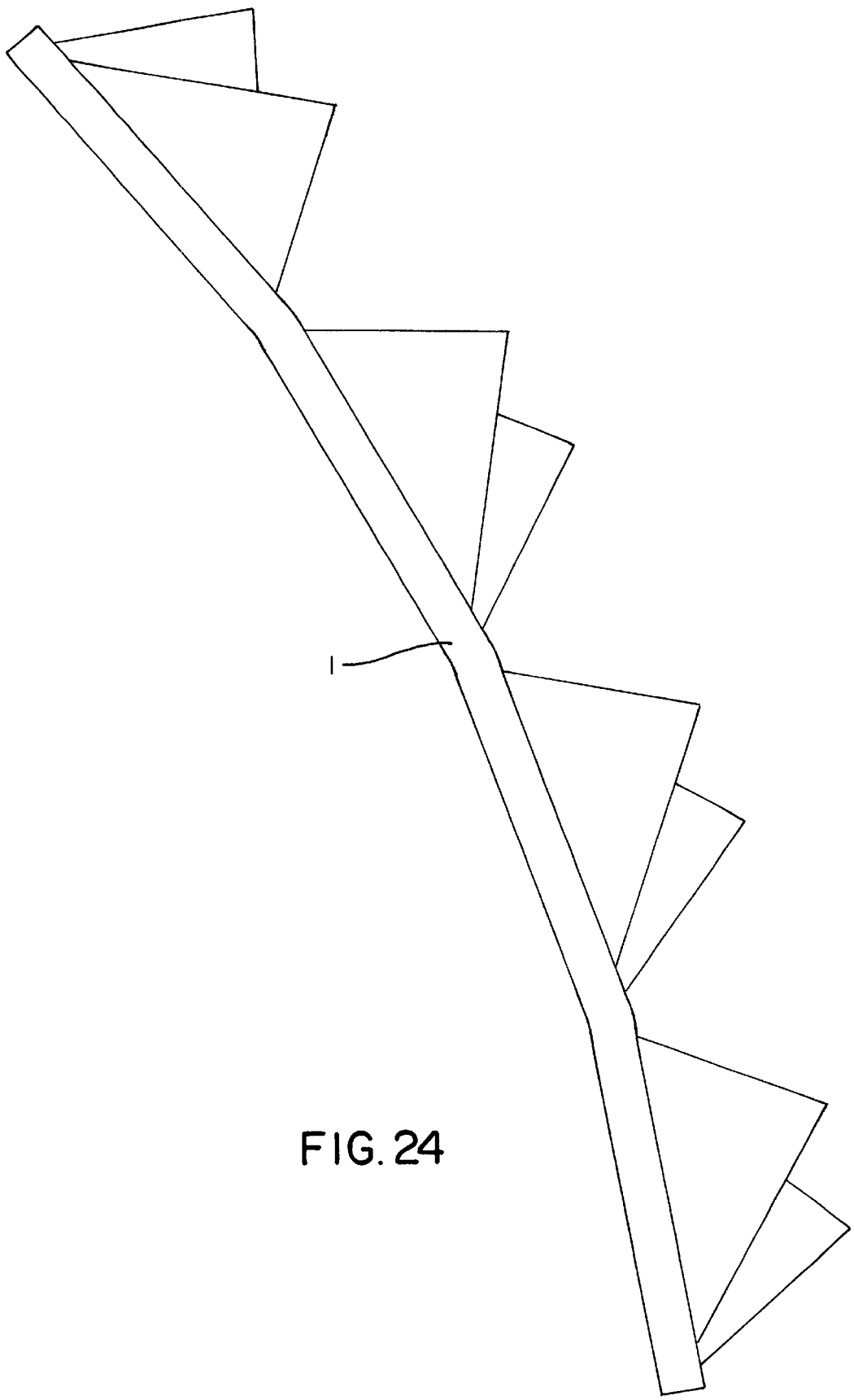
FIG. 24 the same lamella as shown in FIGS. 20 to 23 in a view in the plane of the reference surface Z=0 which, in the finished tire, corresponds to at least approximately the radial view.

FIG. 24 shows the same lamella 1 as in FIGS. 20 through 23 in a view in the plane of the Z=0 reference surface which in the finished tire corresponds substantially to the radial view.

Figure 25:
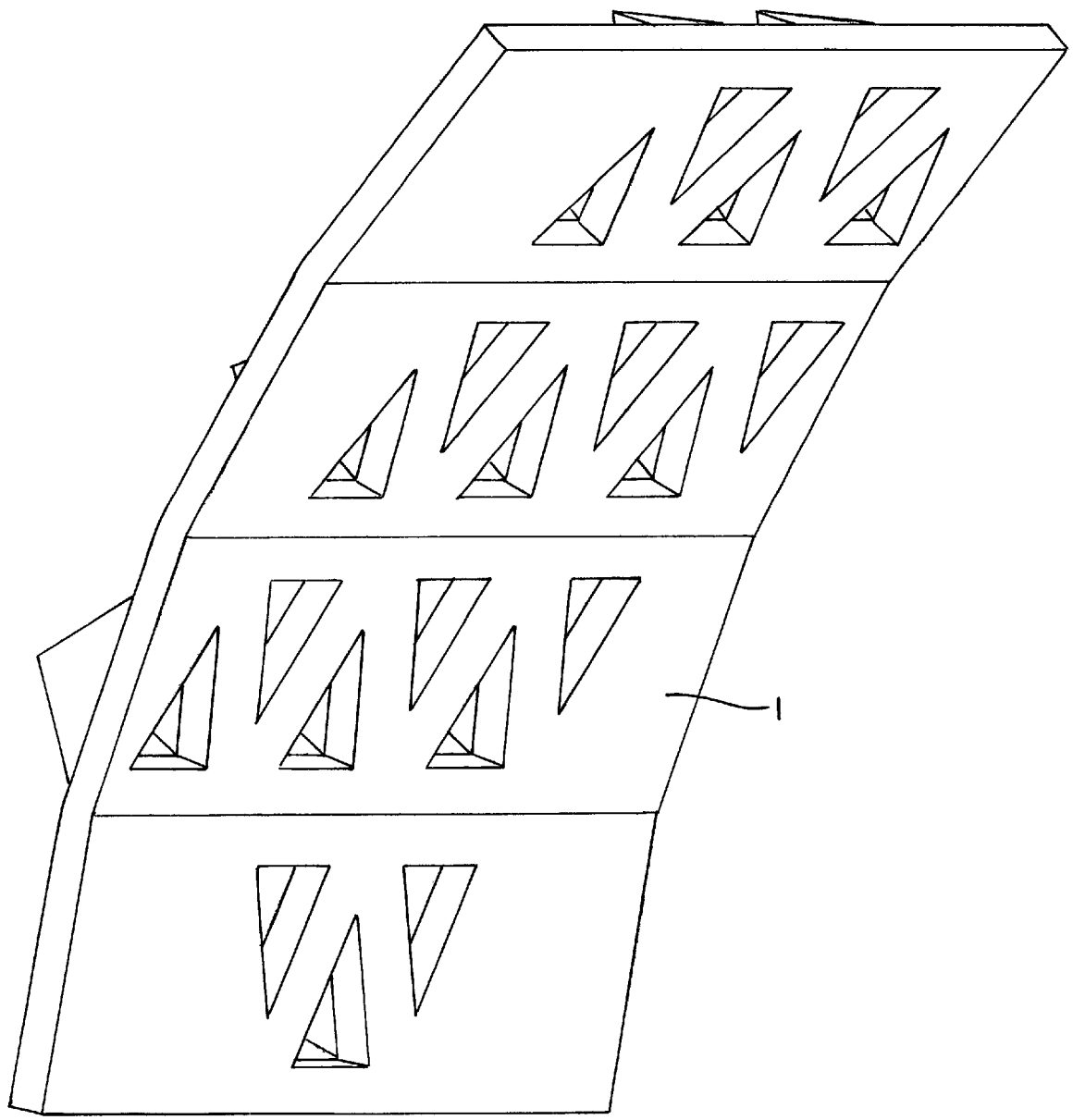
FIG. 25 the same lamella as FIGS. 20 to 24, showing the backside, so that all deformations are depressions.
Figure 27:
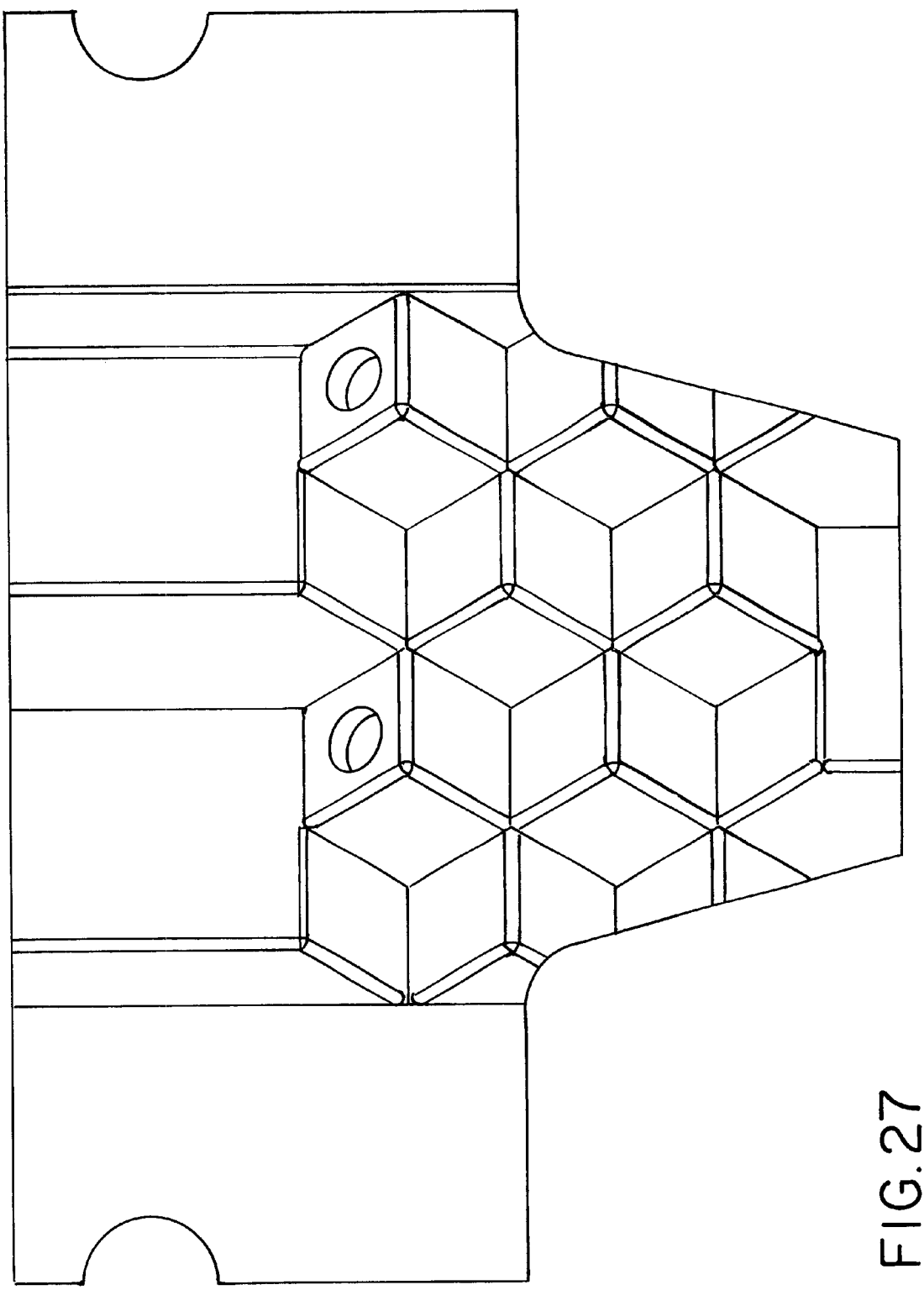
FIG. 27 at an enlarged scale the central frontal view of FIG. 26c.
Figure 28:
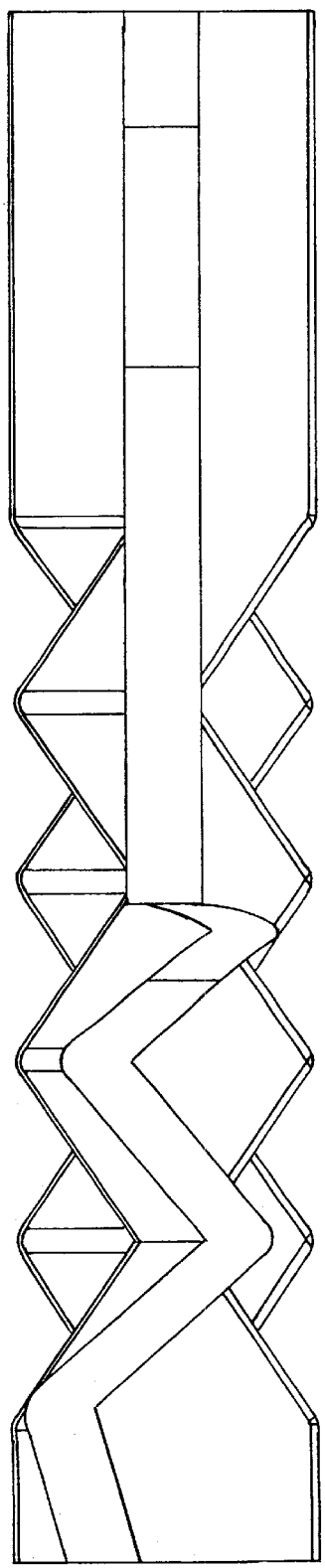
FIG. 28 at the same scale as FIG. 27 the view from the left.
Figure 29:
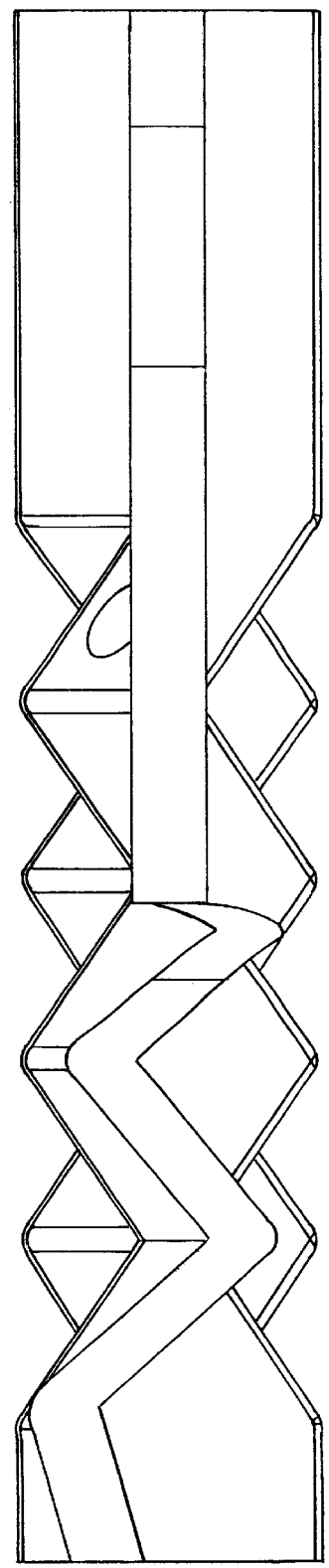
FIG. 29 at the same scale as FIG. 27 the view from the right.
Figure 30:
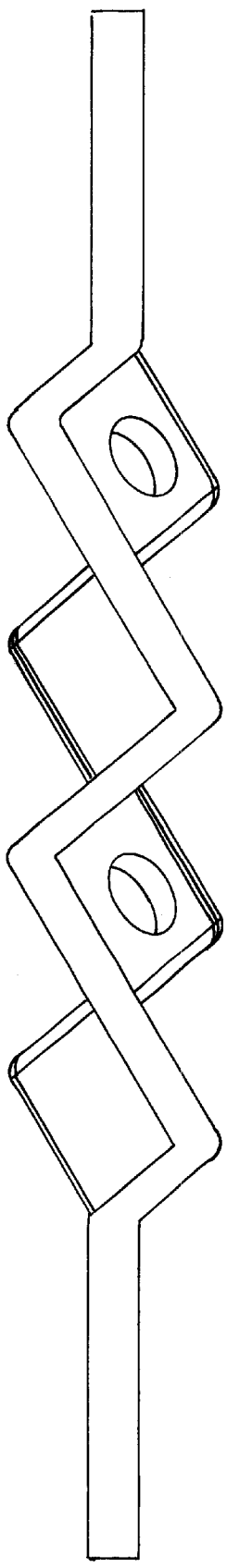
FIG. 30 at the same scale as FIG. 27 the view from above.
Figure 31:
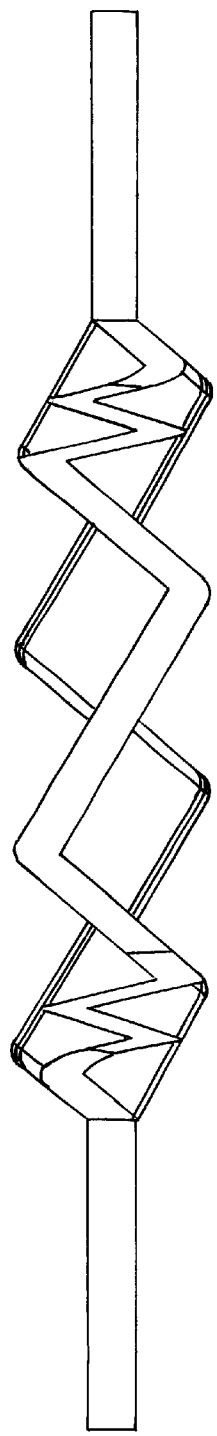
FIG. 31 at the same scale as FIG. 27 the view from below.
Figure 32:
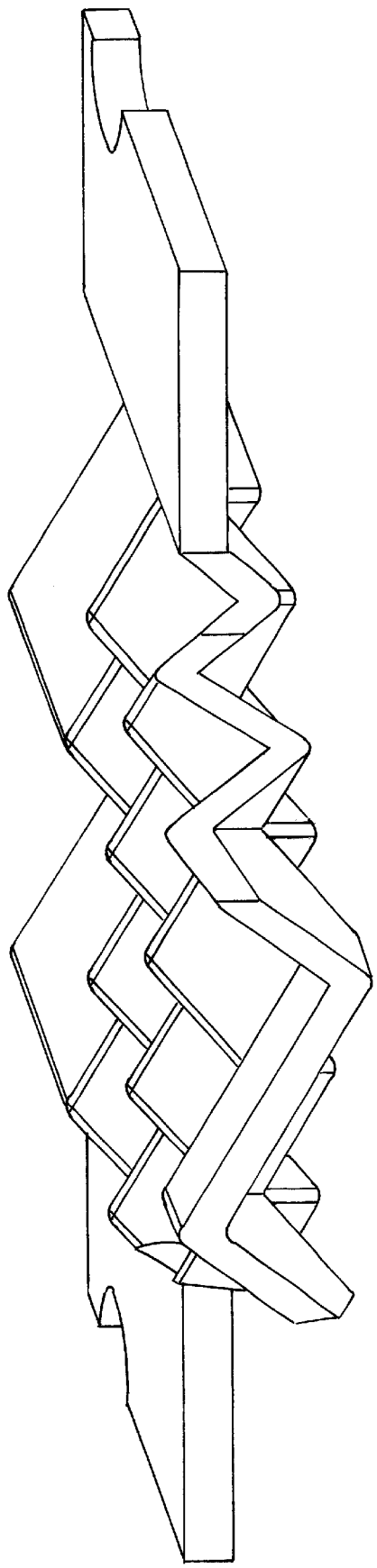
FIG. 32 at the same scale as FIG. 27 a perspective view substantially from below, but viewed from the right and slightly from the front.
Figure 33:
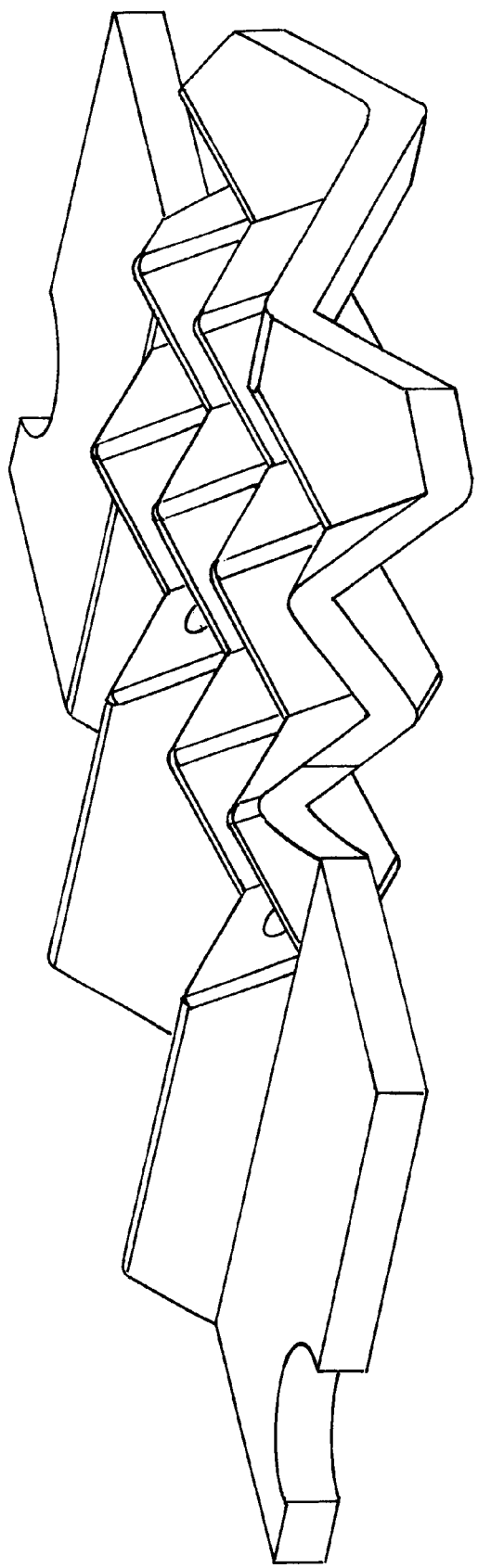
FIG. 33 at the same scale as FIG. 27 a slanted view substantially from below but also clearly from the right and slightly from the front.
Figure 34:
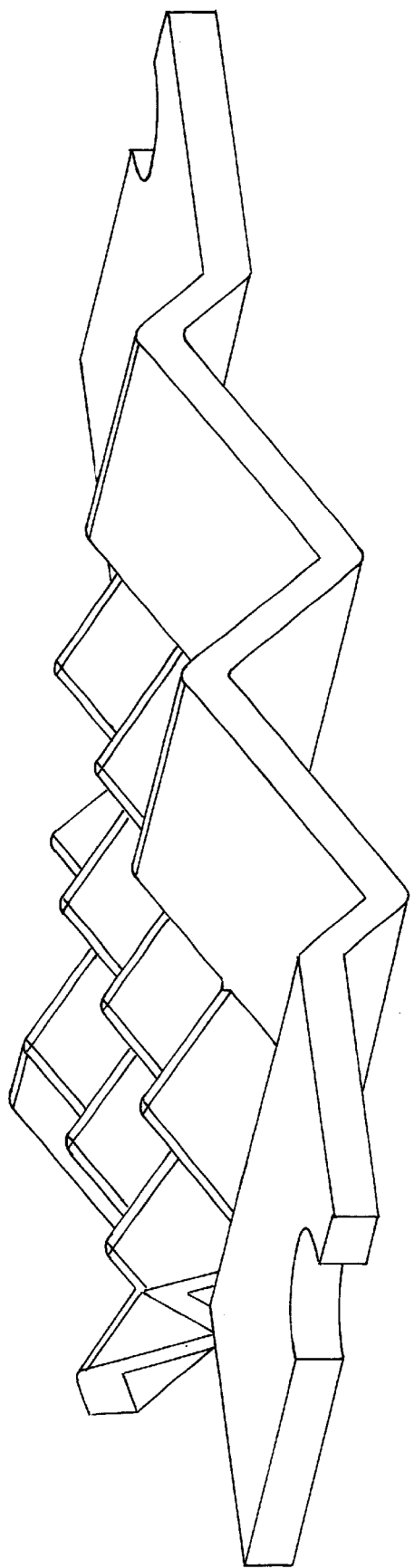
FIG. 34 at the same scale as FIG. 27 a slanted view substantially from above and from the left.
Figure 35:
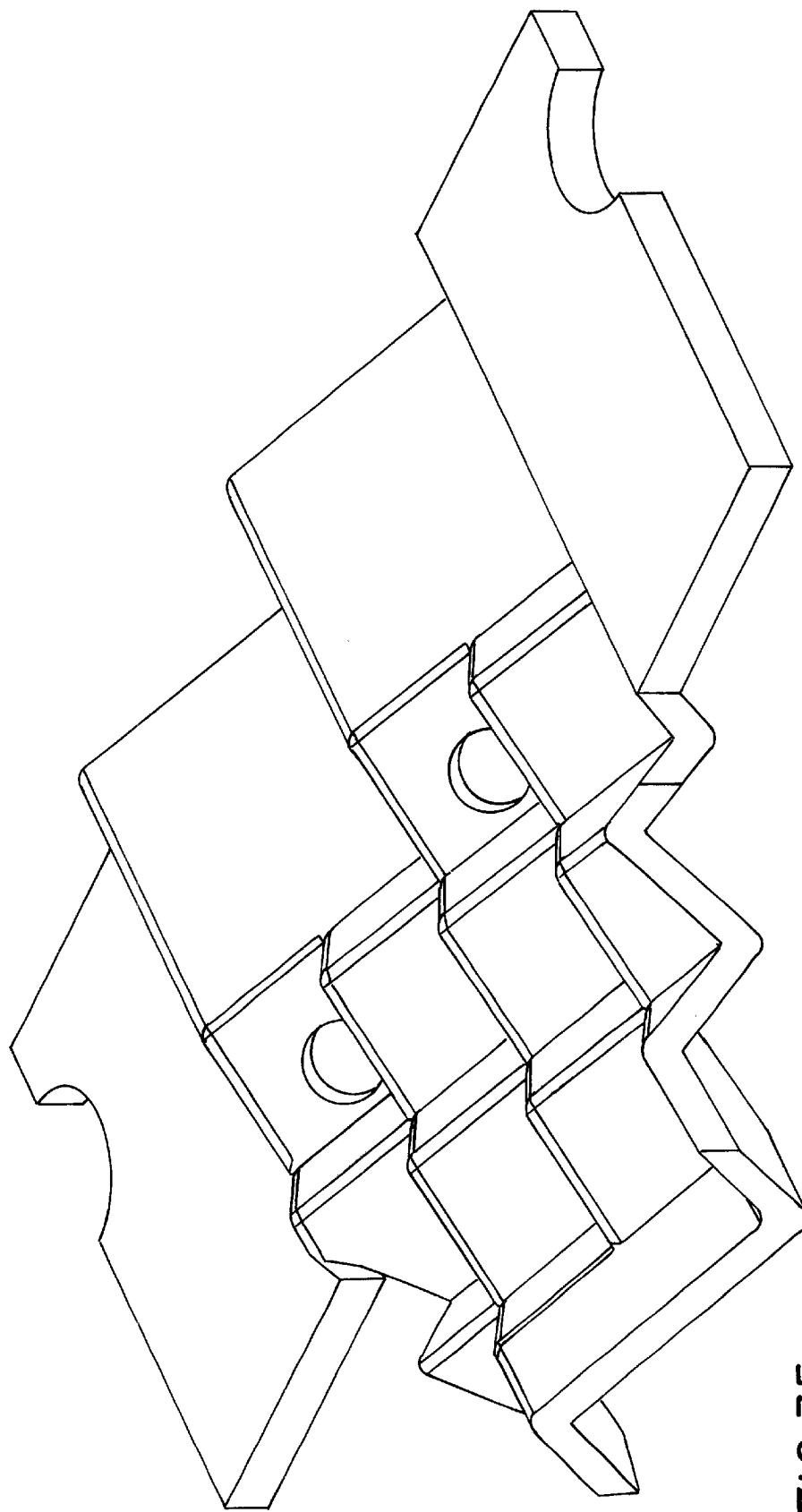
FIG. 35 at the same scale as FIG. 27 a slanted view similar to FIG. 32 but more from the front.
Figure 36:
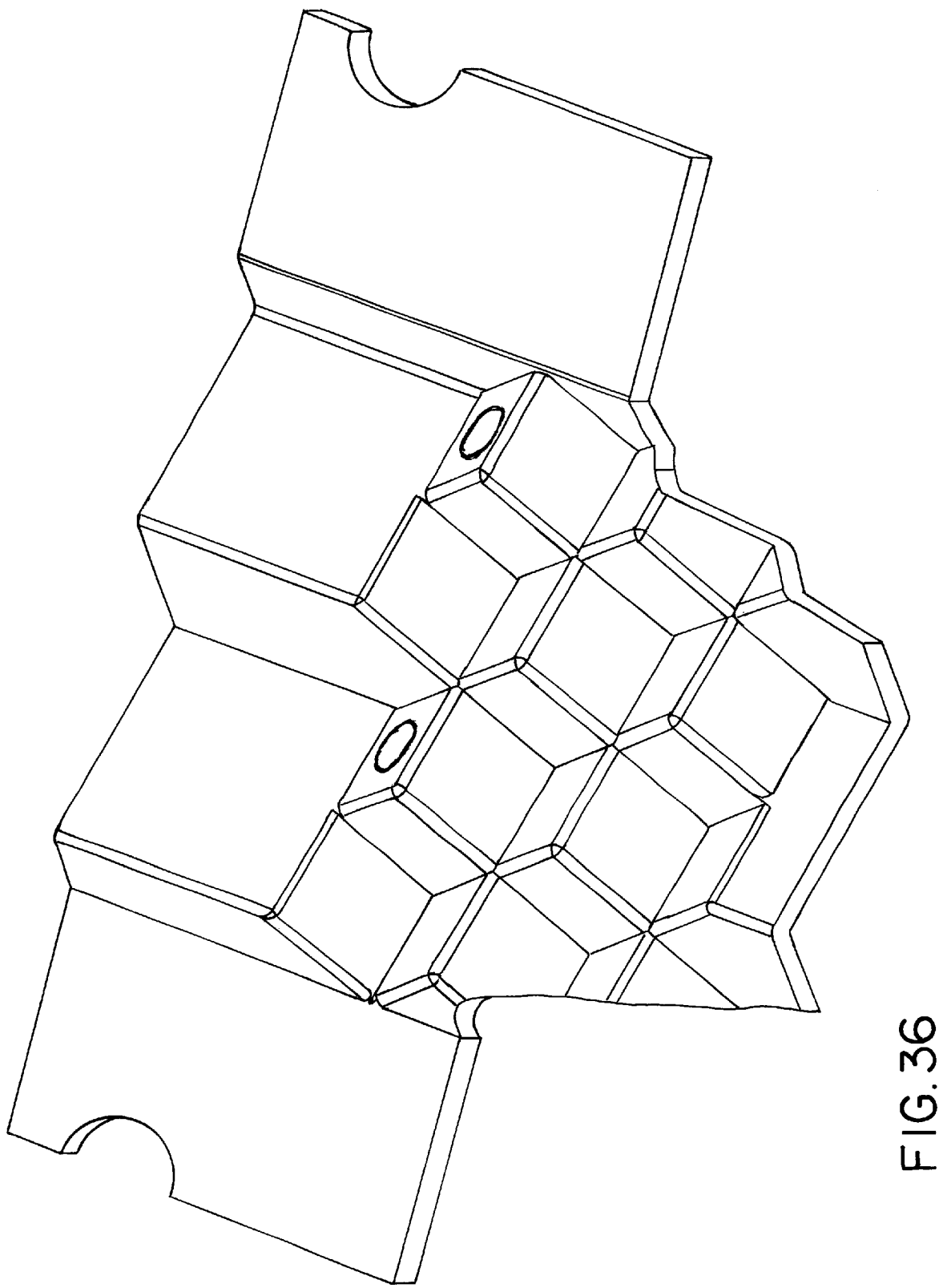
FIG. 36 at the same scale as FIG. 27 a slanted view similar to FIG. 35 but even further from the front.
Figure 37:
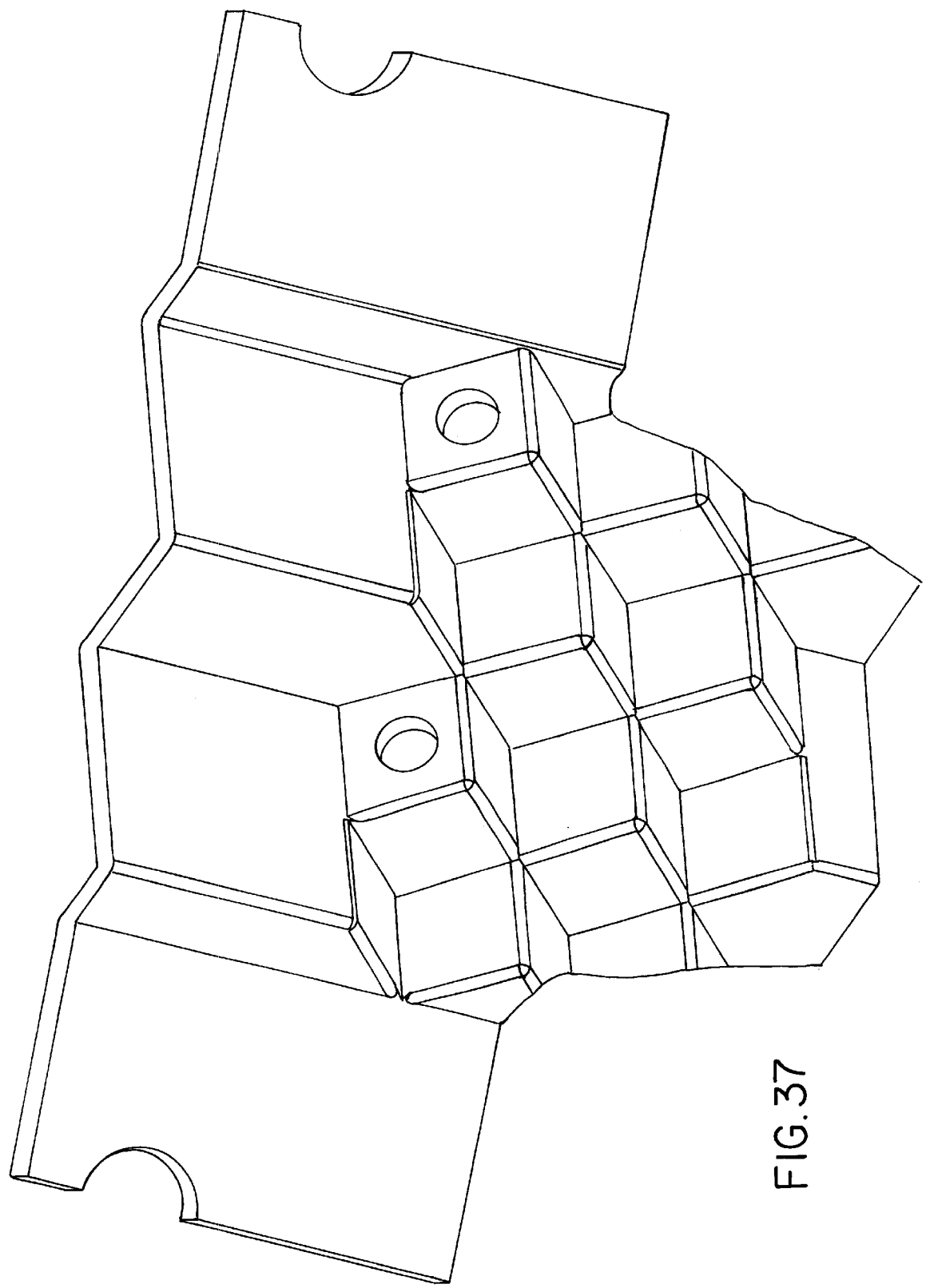
FIG. 37 similar to FIG. 27 and at the same scale the last view of this lamella viewed slightly slanted from the left and from above.

FIG. 25 finally shows the same lamella 1 as FIGS. 20 through 24 in a view onto the backside so that all deformations are shown as depressions.

A plurality of such curved areas can be arranged adjacent to one another whereby the areas are preferably non-continuously curved. Also, changing curvature orientations are possible so that, with reference to the tire to be produced, a zigzag or wave-shaped course results in a radial view. Preferably, the deformations extend away from the outer side of the curvature, i.e., project away from it. In the area of the reversal where there is hardly any curvature, projections can be advantageously arranged in both circumferential orientations of the tire to be finished, i.e., projections and depressions.

It is not required that a dividing line extends exactly axially within the finished tire, as has been shown in all previous Figures, or precisely radially, as shown in FIGS. 26 through 37. Instead it may be advantageous with respect to tread depth loss caused by wear to have a slanted orientation, for example, at an angle of 11°.

While the lamella embodiment I (FIGS. 7 through 13) is planar in the areas 16 and 17, the lamella embodiment V according to FIGS. 26 through 37 is folded one-dimensional in these areas, i.e., along the radial lines. In the other areas, it is folded three-dimensionally, as in the embodiment I. Otherwise, the lamella V is designed analog to lamella 1, i.e., with semicircular recesses 13 for anchoring penetrations 15 for venting, and rounded portions (double lines) of projecting edges.

The invention is not limited to the represented embodiments of which the examples IV and V are to be considered the most expedient ones. All other modifications are to be included in as much as they make use of the present invention, i.e., have individual deformations relative to a Z=0 reference surface of a lamella in one or both orientations such that in the Z=0 reference surface the deformations have a base surface that is substantially triangular and has contours aligned with one another so that the dividing lines positioned on or between the base lines of these deformations, provide a substantially areal framework of aligned triangles.

The specification incorporates by reference the disclosure of German priority document 198 12 778.2 of Mar. 24, 1998.

The present invention is, of course, in no way restricted to the specific disclosure of the specification and drawings, but also encompasses any modifications within the scope of the appended claims.

List of Reference Numerals

1 Lamella
2 Vulcanization mold with lamella 1
3 Vehicle tire, manufactured in vulcanization mold 2
4 Projections in lamella 1
5 Depressions in lamella 1
6 Transverse grooves of the tread of the tread surface L of the tire 3
7 Wide circumferential grooves of the tread surface L of the tire 3
8 Narrow circumferential grooves of the tread surface L of the tire 3
9 Blocks as positives of the tread surface L of the tire 3
9a Left block of the tread surface portion shown in FIGS. 2 through 6
9b Right block of the tread portion shown in FIGS. 2 through 6
10 Sipe in tread surface L of the tire 3, manufactured by lamella 1
11 Periphery of the mold interior of the vulcanization mold 2

12 Base of lamella 1 with which it extends into the vulcanization mold 2 for the purpose of anchoring
13 Semicircular recesses in base 12 for reinforcing the anchoring action
14 Through bores in base 12 for reinforcing the anchoring action
15 Venting penetrations at the radially outer edge of the free area of lamella 1
16 Smooth radial inner portion of lamella 1
17 Smooth axial outer portion of lamella 1
b Width of the stay S of the framework
t Edge length of the smallest triangle defined by three crossing dividing lines T=spacing from the center of the respective intercepting points, often also simply referred to as dividing length
th Length of the bisecting line in the aforementioned smallest triangles, i.e., from one intersecting point to the center of the opposite side, equal to smallest possible dividing length of the repeating unit in the sequence of projections and depressions (for +++++++)
B Base line (in FIGS. 2 through 23 not used because due to the stay width 0, they practically coincide with T) of a pyramid=section line between a lateral surface of such pyramid and an imaginary base surface; the base surface, when viewed from the top, is the deepest, respectively, when viewed from the crater, the highest surface perpendicular to the height or depth of the top or crater, which is similar (i.e., triangular) to all other pyramid section surfaces arranged above or below
BK Crest, linear (line-shaped) highest location of a projection 4
G Top (point-shaped highest location) of a projection 4
  G1 radially inner left top of lamella 1 in FIGS. 7 and 9
  G2 radial inner central top of lamella 1 in FIGS. 7 and 9
  G3 radially inner right top of lamella 1 in FIGS. 7 and 9
K Crater (point-shaped deepest location) of a depression 5
L Tread surface of vehicle tire 3
S Stay having width b in the surrounding area of T within the Z=0 reference surface, formed by spacing of the deformation edges (=base lines B for the preferably pyramid-shaped deformations from one another)
T Dividing line
TS Valley bottom, line-shaped deepest location of depression 5
Z4 Height of the projections 4, to be measured substantially parallel to the peripheral surface P of the tread surface L
Z5 Depth of the depressions 5, to be measured substantially parallel to the peripheral surface P of the tread surface L
Zg Height of top G
Zk Depth of the crater K
Zt Height of the dividing line T, for definition of the Z=0 reference surface set to be 0

What is claimed is:

1. A lamella for use in a vehicle tire vulcanization mold, said lamella having:
   a) projections (4) and depressions (5), said projections (4) and depressions (5) being defined by said lamella, wherein a height (Z4) of said projections (4) and a depth (Z5) of said depressions (5) extend substantially parallel to a peripheral surface (P) of a tire tread (L) of a vehicle tire to be molded in the vehicle tire vulcanization mold;
   b) wherein said lamella has a thickness of approximately 0.5 mm;
   c) wherein each one of said projections (4) has a highest point-shaped location or top (G) correlated therewith;
   d) wherein each one of said projections (4) have a plurality of walls, each said wall having a wall thickness, wherein said wall thickness thins as said wall extends from a base of said projection (4) to said highest point-shaped location or top (G);
   e) wherein each one of said depressions (5) has a lowest point-shaped location (K) correlated therewith;
   f) wherein said projections (4) and depressions (5) are distributed according to a substantially uniform areal division;
   g) wherein said areal division is defined by dividing lines (T) extending in a dividing line plane, wherein said dividing line plane is positioned between a first plane defined by said tops (G) and a second plane defined by said craters (K);
   h) wherein said dividing lines (T) are comprised of three sets, wherein said dividing lines within each one of said sets extend parallel to one another; and
   i) wherein said dividing lines of different ones of said sets intercept one another at an angle of 60° so that a grid of triangles is formed.

2. A lamella according to claim 1, wherein each one of said projections (4) is a pyramid having a triangular base.

3. A lamella according to claim 1, wherein each one of said depressions (5) is an inverted pyramid having a triangular base.

4. A lamella according to claim 1, wherein:
   each one of said projections (4) is a pyramid having a triangular base;
   each one of said depressions (5) is an inverted pyramid having a triangular base;
   said triangular bases of said projections (4) and of said depressions (5) have three base lines (B), respectively; and
   all three of said base lines (B) are located in said dividing line plane, said dividing line plane being centrally arranged between said first and second planes.

5. A lamella according to claim 4, wherein parallel to each one of said three base lines (B) of said projections (4) one of said base lines (B) of said triangular base of said depressions (5) is positioned in close proximity, and wherein parallel to each one of said three base lines (B) of said depressions (5) one of said base lines (B) of said triangular base of said projections (4) is positioned in close proximity.

6. A lamella according to claim 5, wherein said parallel base lines (B) of said projections (4) and said depressions (5) coincide with one another and thus also with said dividing lines (T).

7. A lamella according to claim 5, wherein said parallel base lines (B) of said projections (4) and said depressions (5) are spaced at a distance (b) from one another so that said parallel base lines (B) define edges of said projections (4) and said depressions (5) and a stay is formed between said edges.

8. A lamella according to claim 7, wherein said distance (b) is smaller than 40% of said base line (B).

9. A lamella according to claim 8, wherein said distance (b) is smaller than 20% of said base line (B).

10. A lamella according to claim 7, wherein said edges are rounded.

11. A lamella according to claim 7, wherein said spacing (b) is at most twice a thickness of said stay.

12. A lamella according to claim 1, wherein said dividing line plane is non-planar.

13. A lamella according to claim 12, wherein said dividing line plane has a shape of a cylinder mantle portion.

14. A lamella according to claim 12, wherein said dividing line plane has an angled shape of a polygon prism.

15. A lamella according to claim 14, wherein bending lines of said angled shape coincide with at least some of said dividing lines (T) of one of said three sets and wherein said bending lines extend substantially radially relative to the vehicle tire to be molded.

16. A lamella according to claim 12, wherein said dividing line plane has alternatingly a shape of a cylinder mantle portion and of an angled shape of a polygon prism.

17. A lamella for use in a vehicle tire vulcanization mold, said lamella having:
   a) projections (4) and depressions (5), said projections (4) and depressions (5) being defined by said lamella, wherein a height (Z4) of said projections (4) and a depth (Z5) of said depressions (5) extend substantially parallel to a peripheral surface (P) of a tire tread (L) of a vehicle tire to be molded in the vehicle tire vulcanization mold;
   b) wherein said lamella has a thickness of approximately 0.5 mm;
   c) wherein each one of said projections (4) has a highest line-shaped location or crest (BK) correlated therewith;
   d) wherein each one of said projections (4) have a plurality of walls, each said wall having a wall thickness, wherein said wall thickness thins as said wall extends from a base of said projection (4) to said highest point-shaped location or top (G);
   e) wherein each one of said depressions (5) has a lowest point-shaped location or crater (K) correlated therewith;
   f) wherein said projections (4) and depressions (5) are distributed according to a substantially uniform areal division;
   g) wherein said areal division is defined by dividing lines (T) extending in a plane positioned in a plane defined by said crests (BK);
   h) wherein said dividing lines (T) are comprised of three sets, wherein said dividing lines within each one of said sets extend parallel to one another; and
   i) wherein said dividing lines of different one of said sets intercept one another at an angle of 60° so that a grid of triangles is formed.

18. A lamella according to claim 17, wherein each one of said depressions (5) is an inverted pyramid having a triangular base.

19. A lamella according to claim 17, wherein said dividing line plane is non-planar.

20. A lamella according to claim 19, wherein said dividing line plane has a shape of a cylinder mantle portion.

21. A lamella according to claim 19, wherein said dividing line plane has an angled shape of a polygon prism.

22. A lamella according to claim 21, wherein bending lines of said angled shape coincide with at least some of said dividing lines (T) of one of said three sets and wherein said bending lines extend substantially radially relative to the vehicle tire to be molded.

23. A lamella according to claim 19, wherein said dividing line plane has alternatingly a shape of a cylinder mantle portion and of an angled shape of a polygon prism.

24. A lamella for use in a vehicle tire vulcanization mold, said lamella having:
   a) projections (4) and depressions (5), wherein a height (Z4) of said projections (4) and a depth (Z5) of said depressions (5) extend substantially parallel to a peripheral surface (P) of a tire treat (L) of a vehicle tire to be molded in the vehicle tire vulcanization mold;
   b) wherein said projections (4) and depressions (5) are distributed according to a substantially uniform areal division;
   c) wherein said lamella has a first area in which first ones of said projections (4) have a highest point-shaped location or top (G) correlated therewith;
   d) wherein each one of said projections (4) has a plurality of walls, each said wall having a wall thickness, wherein said wall thickness thins as said wall extends from a base of said projection (4) to said highest point-shaped location or top (G);
   e) wherein in said first area first ones of said depressions (5) have a lowest point-shaped location or crater (K) correlated therewith;
   f) wherein said lamella has a second area in which second ones of said projections (4) have a highest line-shaped location or crest (BK) and second ones of said depressions (5) have a lowest point-shaped location or crater (K) correlated therewith or wherein second ones of said projections (4) have a highest point-shaped location or top (G) and second ones of said depressions (5) have a lowest line-shaped location or valley (S) correlated therewith;
   g) wherein said areal division is defined by dividing lines (T) extending in a dividing line plane;
   h) wherein each one of said first projections (4) is a pyramid having a triangular base and wherein each one of said first depressions (5) is an inverted pyramid having a triangular base;
   i) wherein said triangular bases of said first projections (4) and of said first depressions (5) have three base lines (B), respectively, and wherein all three of said base lines (B) are located in said dividing line plane;
   j) wherein parallel to each one of said three base lines (B) of said first projections (4) one of said base lines (B) of said triangular base of said first depressions (5) is positioned in close proximity and wherein parallel to each one of said three base lines (B) of said first depressions (5) one of said base lines (B) of said triangular base of said first projections (4) is positioned in close proximity;
   k) wherein said dividing lines (T) are comprised of three sets, wherein said dividing lines within each one of said sets extend parallel to one another;
   l) wherein said dividing lines of different one of said sets intercept one another at an angle of 60° so that a grid of triangles if formed;
   m) wherein said first and second projections (4), represented by +, and said first and second depressions (5), represented by −, along at least one common bisecting line of said triangles are arranged in a pattern deviating from a regular pattern of +−+−+−.

25. A lamella according to claim 24, wherein said deviating pattern is +−−−+−−−.

26. A lamella according to claim 24, wherein said parallel base lines (B) of said first projections and said first depressions coincide with one another and thus also with said dividing lines.

27. A lamella according to claim 24, wherein said parallel base lines (B) of said first projections (4) and said first depressions (5) are spaced from one another at a distance (b) so that said parallel base lines (B) define edges of said first projections (4) and said first depressions (5) and a stay is formed between said edges.

28. A lamella according to claim 27, wherein said distance (b) is smaller than 40% of said base line (B).

29. A lamella according to claim 28, wherein said distance (b) is smaller than 20% of said base line (B).

30. A lamella according to claim 27, wherein said edges are rounded.

31. A lamella according to claim 27, wherein said spacing (b) is at most twice a thickness of said stay.

32. A lamella according to claim 24, wherein said dividing line plane is non-planar.

33. A lamella according to claim 32, wherein said dividing line plane has a shape of a cylinder mantle portion.

34. A lamella according to claim 32, wherein said dividing line plane has an angled shape of a polygon prism.

35. A lamella according to claim 34, wherein bending lines of said angled shape coincide with at least some of said dividing lines (T) of one of said three sets and wherein said bending lines extend substantially radially relative to the vehicle tire to be molded.

36. A lamella according to claim 32, wherein said dividing line plane has alternatingly a shape of a cylinder mantle portion and of an angled shape of a polygon prism.

37. A vehicle tire vulcanization mold having lamellas for producing sipes in a tire tread (L), wherein at least some of said lamellas are embodied according to claim 1.

38. A vehicle tire vulcanization mold having lamellas for producing sipes in a tire tread (L), wherein at least some of said lamellas are embodied according to claim 17.

39. A vehicle tire vulcanization mold having lamellas for producing sipes in a tire tread (L), wherein at least some of said lamellas are embodied according to claim 24.

40. A vehicle tire having a tire tread with sipes, wherein at least some of said sipes are produced with lamellas (L) embodied according to claim 1.

41. A vehicle tire having a tire tread with sipes, wherein at least some of said sipes are produced with lamellas (L) embodied according to claim 17.

42. A vehicle tire having a tire tread with sipes, wherein at least some of said sipes are produced with lamellas (L) embodied according to claim 24.

* * * * *